United States Patent
Batt et al.

(10) Patent No.: US 9,725,190 B2
(45) Date of Patent: Aug. 8, 2017

(54) AIRCRAFT ENGINE INLET ASSEMBLY APPARATUS

(71) Applicant: The Boeing Company, Chicago, IL (US)

(72) Inventors: Edward Batt, Bothell, WA (US); Tanni Sisco, Mukilteo, WA (US); Daniel Smith, Scottsdale, AZ (US); Randy Woolridge, Saint Clair Shores, MI (US); Samuel Edward Antonucci, Saint Clair Shores, MI (US); Craig Roedel, Fenton, MI (US)

(73) Assignee: The Boeing Company, Chicago, IL (US)

( * ) Notice: Subject to any disclaimer, the term of this patent is extended or adjusted under 35 U.S.C. 154(b) by 237 days.

(21) Appl. No.: 14/621,680

(22) Filed: Feb. 13, 2015

(65) Prior Publication Data

US 2016/0236798 A1 Aug. 18, 2016

(51) Int. Cl.
*B64F 5/00* (2017.01)
*B64F 5/10* (2017.01)

(52) U.S. Cl.
CPC .............. *B64F 5/0009* (2013.01); *B64F 5/10* (2017.01)

(58) Field of Classification Search
CPC ................ B23P 21/002; B23P 2700/01; Y10T 29/49346; Y10T 29/49622; Y10T 29/53039; Y10T 29/53061; Y10T 29/534; Y10T 29/53417
See application file for complete search history.

(56) References Cited

U.S. PATENT DOCUMENTS

| | | | |
|---|---|---|---|
| 6,328,258 B1 * | 12/2001 | Porte | B64D 29/06 244/53 B |
| 7,383,679 B2 * | 6/2008 | Porte | F01D 21/04 244/53 B |
| 8,152,461 B2 * | 4/2012 | Howarth | B64D 29/00 415/213.1 |
| 8,197,191 B2 * | 6/2012 | Binks | B64D 29/08 415/119 |
| 8,267,642 B2 * | 9/2012 | Binks | B64D 29/08 415/119 |
| 9,327,376 B2 * | 5/2016 | Gamboa | B62D 57/024 |
| 9,352,844 B2 * | 5/2016 | Porte | B64D 33/02 |

(Continued)

*Primary Examiner* — Jacob Cigna
*Assistant Examiner* — Lee A Holly
(74) *Attorney, Agent, or Firm* — Perman & Green LLP

(57) ABSTRACT

A method for assembling an aircraft engine nacelle inlet lip includes automatically positioning, with a controller an automated workstation in two degrees of freedom to position an articulated assembly fixture docking station in at least two predetermined joining positions, and effecting, with the controller, an ordered assembly of at least a forward bulkhead joint, a forward bulkhead to lipskin joint, a chord member to lipskin joint, an inner barrel to lipskin joint, an aft bulkhead to lipskin joint and an outer barrel to lipskin joint through an interface between an automated assembly tool and at least one of a plurality of assembly fixtures interchangeably mounted on the docking station, where each assembly fixture corresponds to an assembly step of the aircraft engine nacelle inlet lip and at least one of the assembly fixtures is common to more than one assembly step of the aircraft engine nacelle inlet lip.

20 Claims, 22 Drawing Sheets

(56) References Cited

U.S. PATENT DOCUMENTS

| | | | | |
|---|---|---|---|---|
| 9,364,926 B2* | 6/2016 | Batt | .................. | B23P 13/00 |
| 9,403,599 B2* | 8/2016 | Binks | .................. | B64D 29/08 |
| 2010/0217437 A1* | 8/2010 | Sarh | .................. | B64F 5/0009 |
| | | | | 700/248 |
| 2012/0137490 A1* | 6/2012 | Kweon | .................. | B23K 31/02 |
| | | | | 29/428 |
| 2014/0026974 A1* | 1/2014 | Desjoyeaux | .................. | B29C 70/48 |
| | | | | 137/15.1 |
| 2014/0064927 A1* | 3/2014 | Binks | .................. | B64D 29/08 |
| | | | | 415/119 |
| 2014/0115894 A1* | 5/2014 | Gamboa | .................. | B62D 57/024 |
| | | | | 29/897.2 |
| 2014/0325813 A1* | 11/2014 | Batt | .................. | B23P 13/00 |
| | | | | 29/428 |
| 2015/0210331 A1* | 7/2015 | Kweon | .................. | B23K 31/02 |
| | | | | 29/897.2 |
| 2015/0367395 A1* | 12/2015 | Ludlow | .................. | B21D 25/02 |
| | | | | 72/352 |
| 2016/0084108 A1* | 3/2016 | Mickelsen | .................. | F01D 25/04 |
| | | | | 415/119 |
| 2016/0185467 A1* | 6/2016 | Lim | .................. | B64F 5/0009 |
| | | | | 29/714 |
| 2016/0200454 A1* | 7/2016 | Gamboa | .................. | B62D 57/024 |
| | | | | 180/125 |
| 2016/0236798 A1* | 8/2016 | Batt | .................. | B64F 5/0009 |
| 2016/0251085 A1* | 9/2016 | Stark | .................. | B64D 29/00 |
| 2016/0257428 A1* | 9/2016 | Batt | .................. | B23P 13/00 |

* cited by examiner

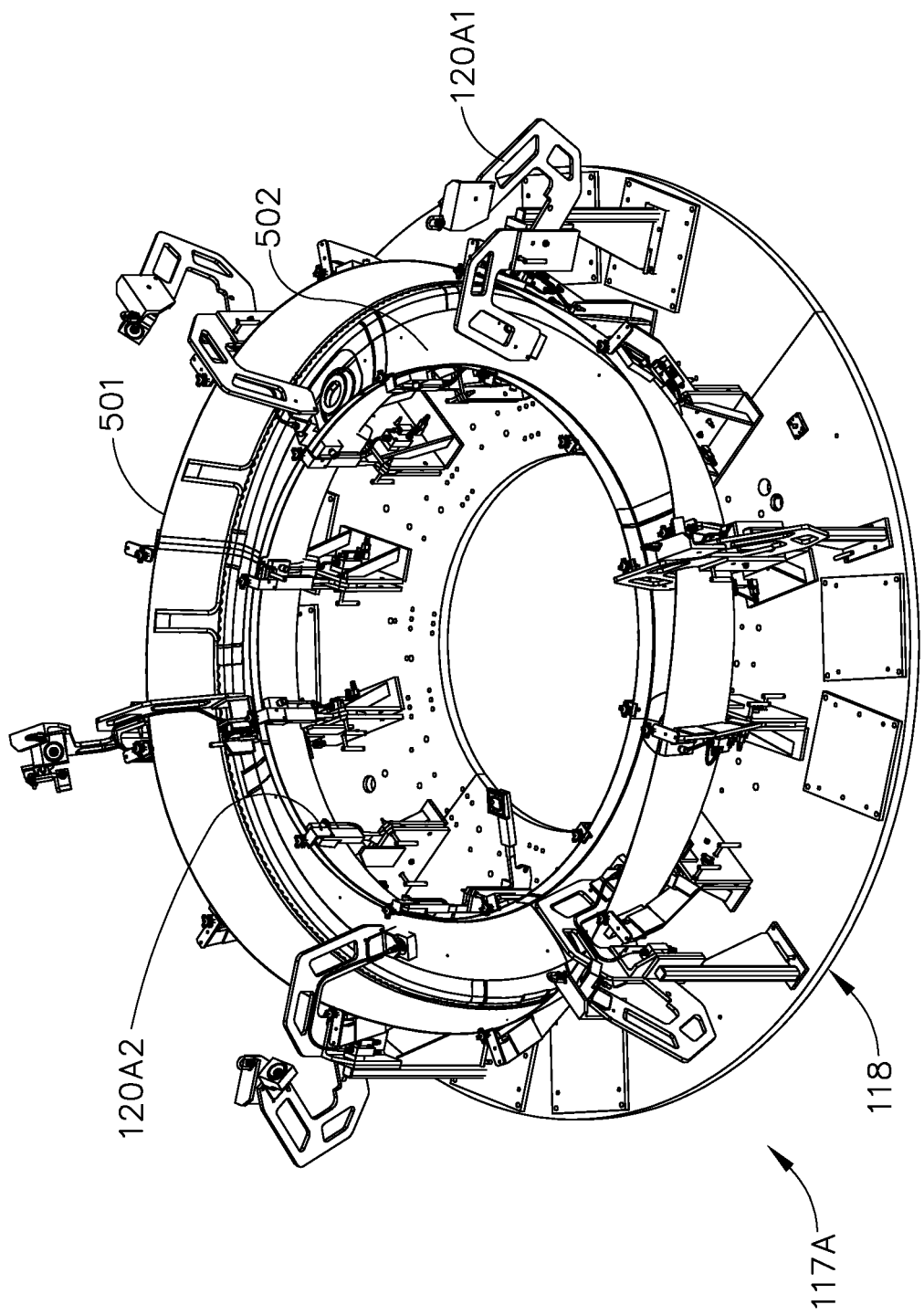

AIRCRAFT ENGINE INLET ASSEMBLY APPARATUS

BACKGROUND

Generally aircraft engine inlets are assembled by hand at manual assembly workstations. Manual assembly of the aircraft engine inlets introduces quality variations, such as between workers assembling similar components. Manual assembly of the aircraft engine inlets may also introduce ergonomic and safety related issues with respect to the workers through, for example, repetitive motion injuries.

In addition, large work areas are needed for any given assembly operation throughput such that workers are provided with sufficient space to maneuver themselves and the parts that need to be assembled.

SUMMARY

Accordingly, apparatus and method, intended to address the above-identified concerns, would find utility.

One example of the present disclosure relates to a method for assembling an aircraft engine nacelle inlet lip having a lipskin, a forward bulkhead, an outer barrel, an inner barrel, an aft attachment ring, one or more chord members, an aft bulkhead and an inner angle member. The method includes automatically positioning, with a controller an automated workstation in two degrees of freedom to position an articulated assembly fixture docking station, of the automated workstation, in at least two predetermined joining positions, and effecting, with the controller, an ordered assembly of at least the forward bulkhead joint, the forward bulkhead to lipskin joint, the chord member to lipskin joint, the inner barrel to lipskin joint, the aft bulkhead to lipskin joint and the outer barrel to lipskin joint through an interface between an automated assembly tool and at least one of a plurality of assembly fixtures interchangeably mounted on the articulated assembly fixture docking station in the at least two predetermined joining positions, where each of the assembly fixtures corresponds to an assembly step of the aircraft engine nacelle inlet lip and at least one of the assembly fixtures is a common fixture that is common to more than one assembly step of the aircraft engine nacelle inlet lip.

One example of the present disclosure relates to an aircraft engine inlet assembly apparatus for assembling an aircraft engine nacelle inlet lip having a lipskin, a forward bulkhead, an outer barrel, an inner barrel, an aft attachment ring, one or more chord members, an aft bulkhead and an inner angle member. The aircraft engine inlet assembly apparatus includes a plurality of assembly fixtures configured to hold one or more respective portions of the aircraft engine nacelle inlet lip, at least one of the plurality of fixtures being a common fixture that is common to more than one assembly step of the aircraft engine nacelle inlet lip; an automated workstation having an articulated assembly fixture docking station and an automated assembly tool configured to interface with the articulated assembly fixture docking station, the articulated assembly fixture docking station having a two degree of freedom movement, and coupling features configured to interchangeably couple each of the plurality of assembly fixtures to the assembly fixture docking station; and a controller connected to the automated workstation and automated assembly tool, the controller being configured to effect two degree of freedom positioning of the articulated assembly fixture docking station in at least two predetermined joining positions, where the controller effects an interface between the automated assembly tool and at least one of the plurality of assembly fixtures disposed on the articulated assembly fixture docking station in the at least two predetermined joining positions, and the at least two joining positions effect an ordered assembly of at least a forward bulkhead joint, a forward bulkhead to lipskin joint, a chord member to lipskin joint, an inner barrel to lipskin joint, an aft bulkhead to lipskin joint and an outer barrel to lipskin joint.

One example of the present disclosure relates to an aircraft engine inlet assembly system for assembling an aircraft engine nacelle inlet lip. The system includes an aircraft engine nacelle inlet lip assembly cell including a plurality of assembly fixtures configured to hold one or more respective portions of the aircraft engine nacelle inlet lip, at least one of the plurality of fixtures being a common fixture that is common to more than one assembly step of the aircraft engine nacelle inlet lip; an automated workstation having an articulated assembly fixture docking station and an automated assembly tool configured to interface with the articulated assembly fixture docking station, the articulated assembly fixture docking station having a two degree of freedom movement, and coupling features configured to interchangeably couple each of the plurality of assembly fixtures to the assembly fixture docking station; and a controller connected to the automated workstation and automated assembly tool, the controller being configured to effect two degree of freedom positioning of the articulated assembly fixture docking station in at least two predetermined joining positions, where the controller effects an interface between the automated assembly tool and at least one of the plurality of assembly fixtures disposed on the articulated assembly fixture docking station in the at least two predetermined joining positions, and the at least two joining positions effect an ordered assembly of at least a forward bulkhead joint, a forward bulkhead to lipskin joint, a chord member to lipskin joint, an inner barrel to lipskin joint, an aft bulkhead to lipskin joint and an outer barrel to lipskin joint of the aircraft engine nacelle inlet lip.

BRIEF DESCRIPTION OF THE DRAWINGS

Figure 1:
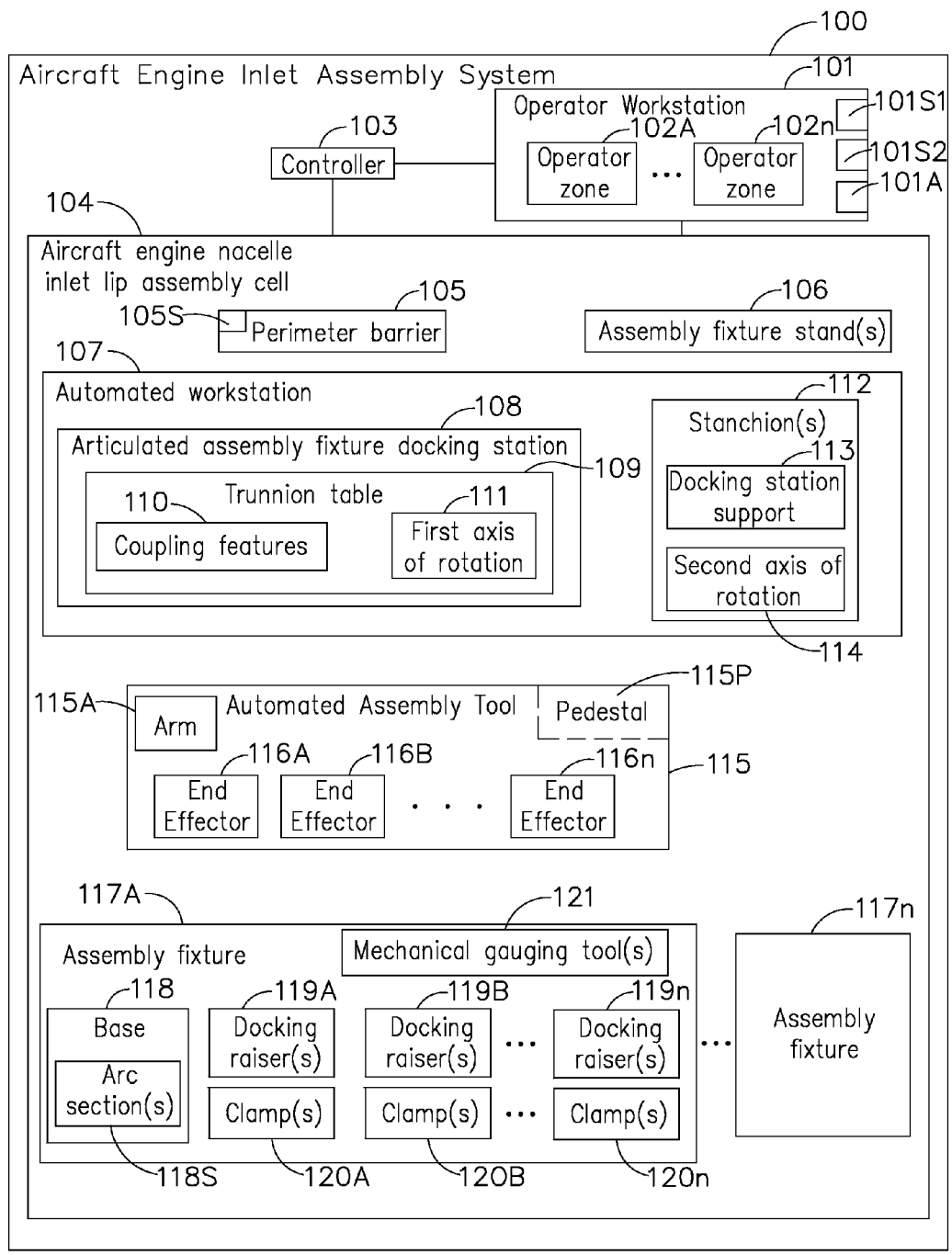
Figure 2:
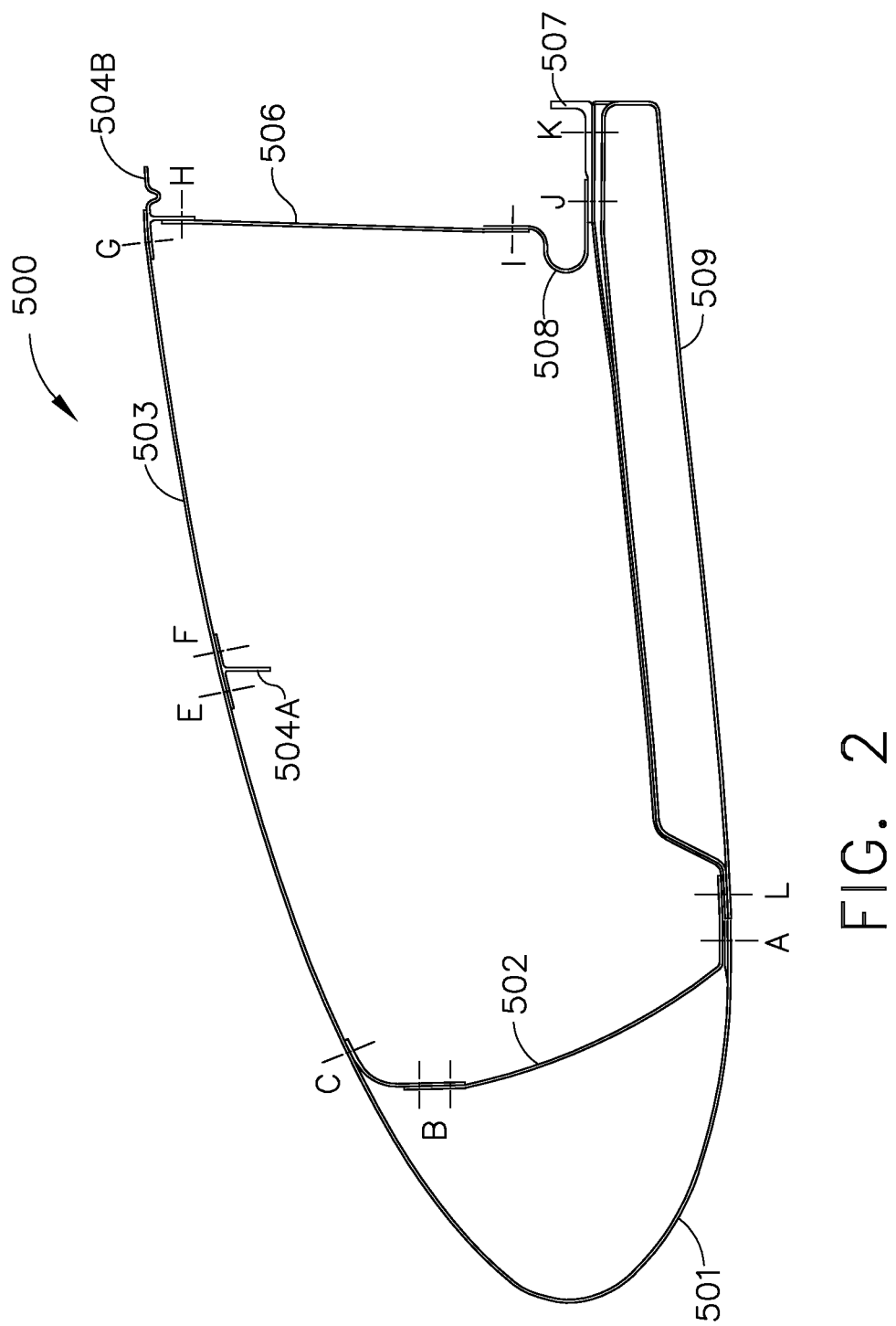
Figure 3:
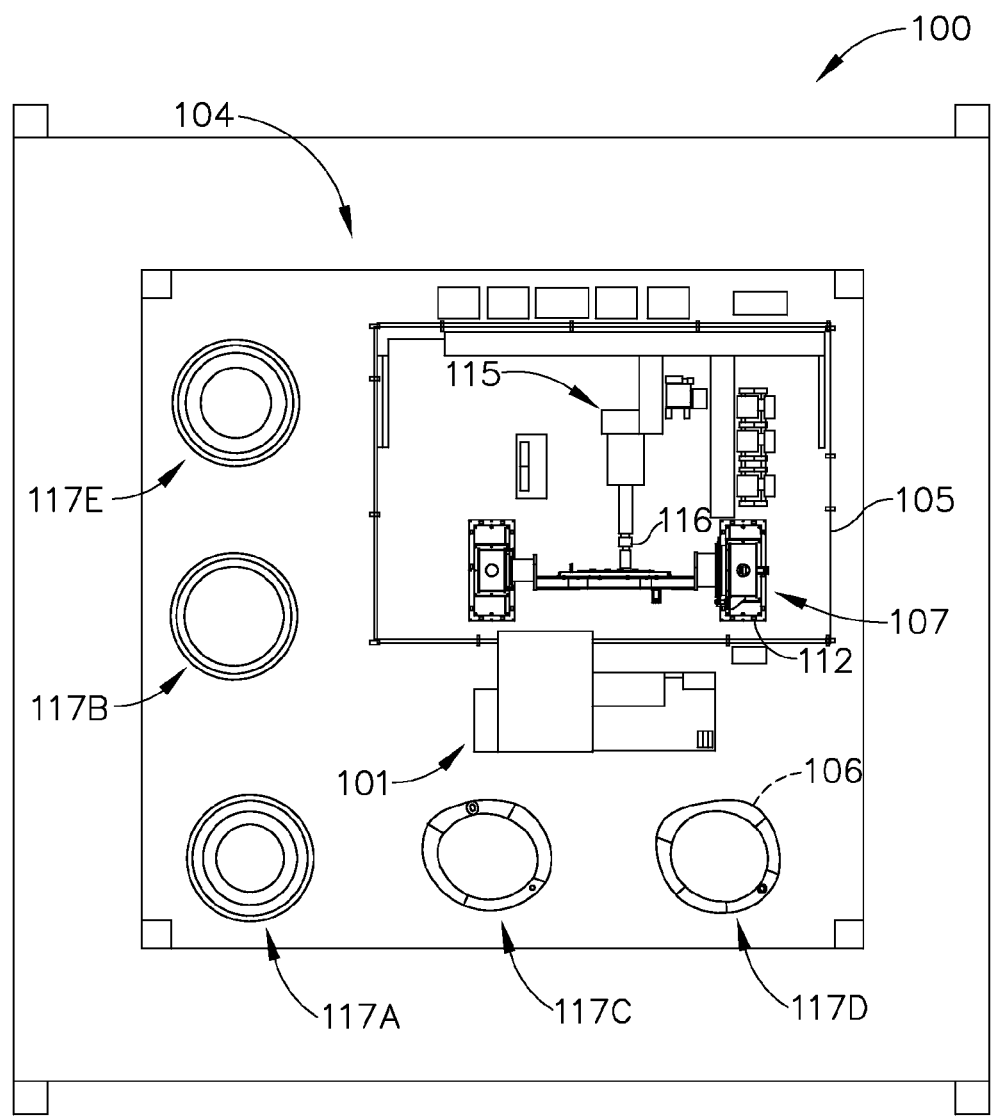
Figure 4:
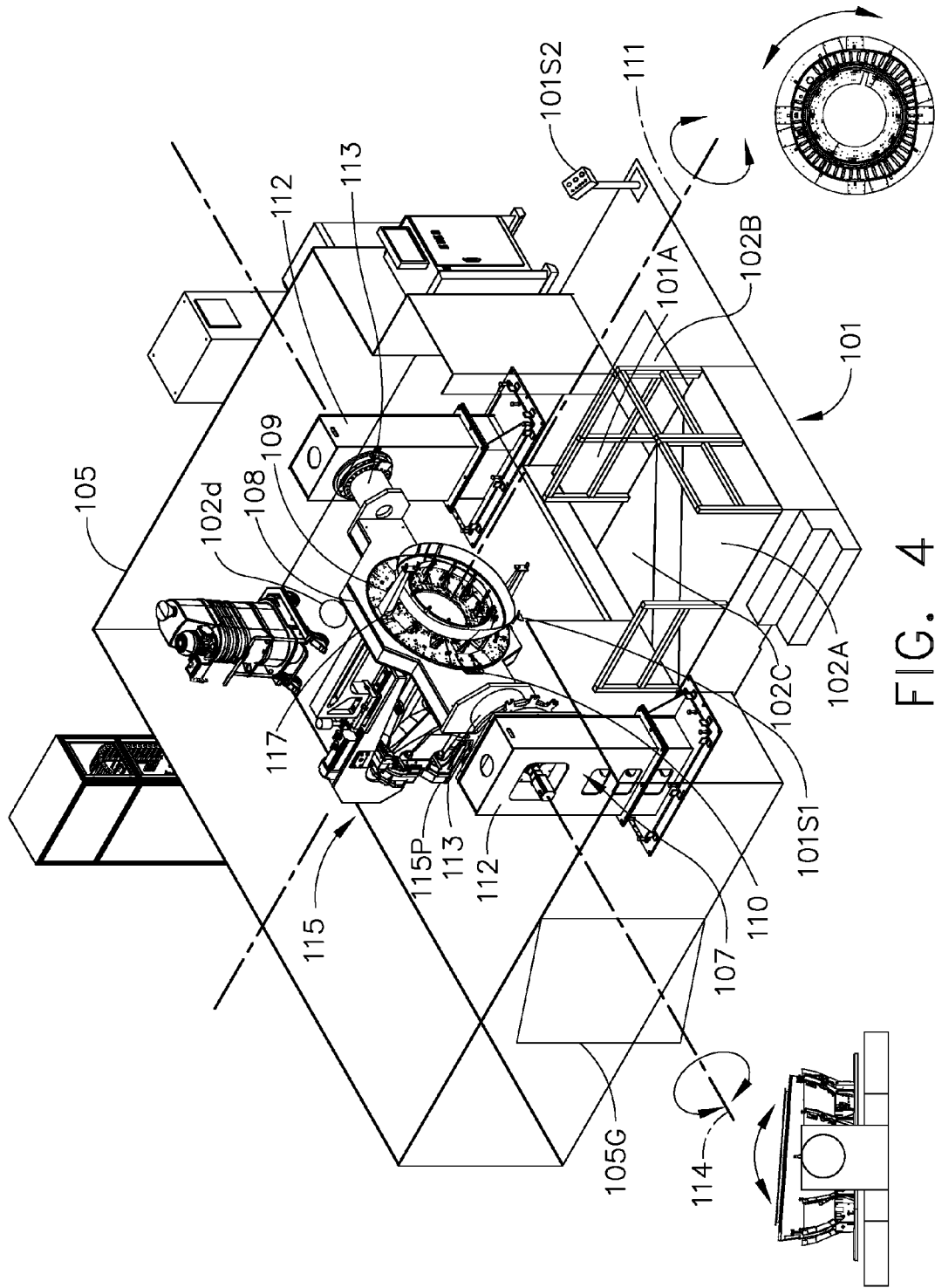
Figure 5A:
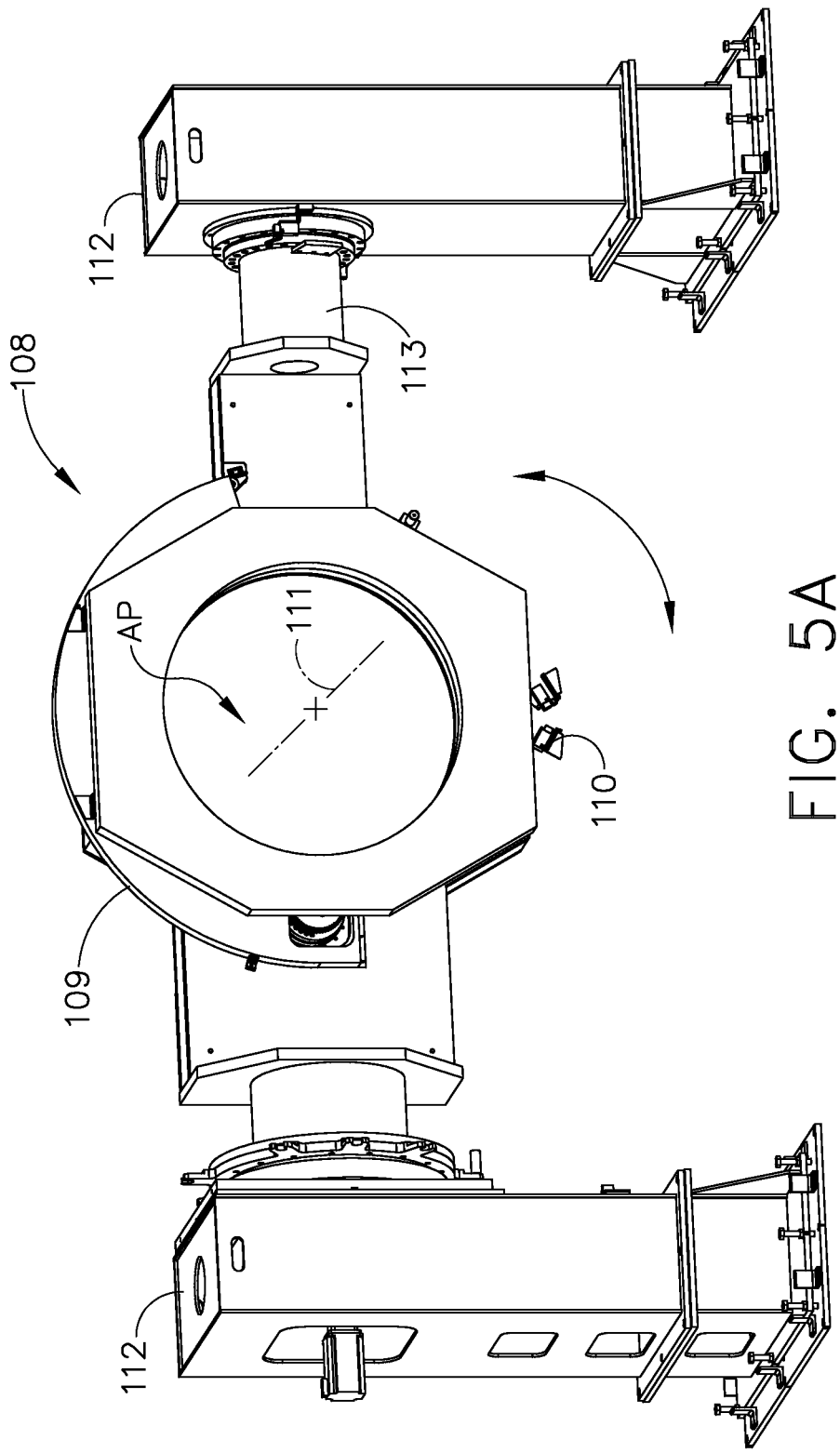
Figure 5B:
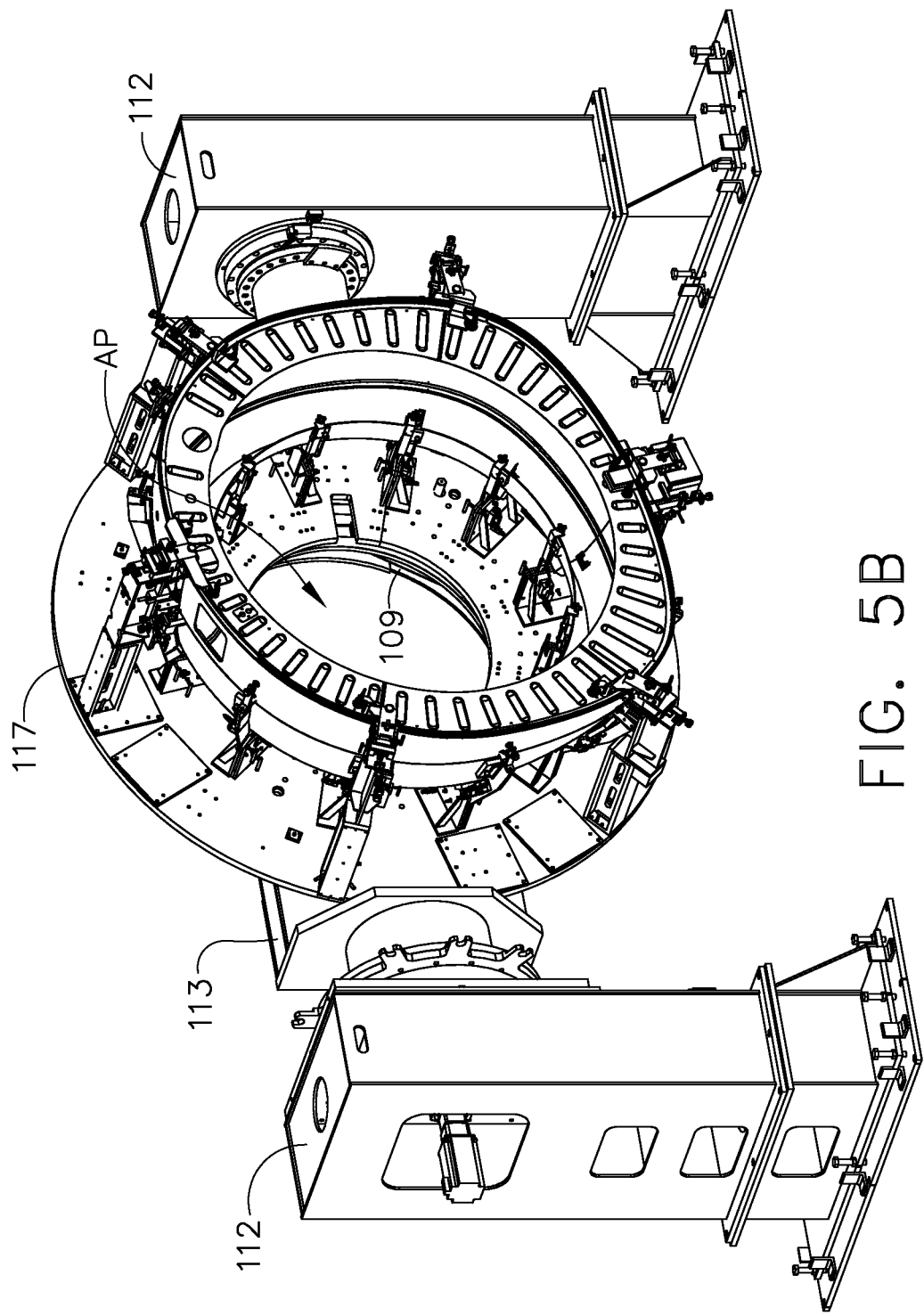
Figure 6A:
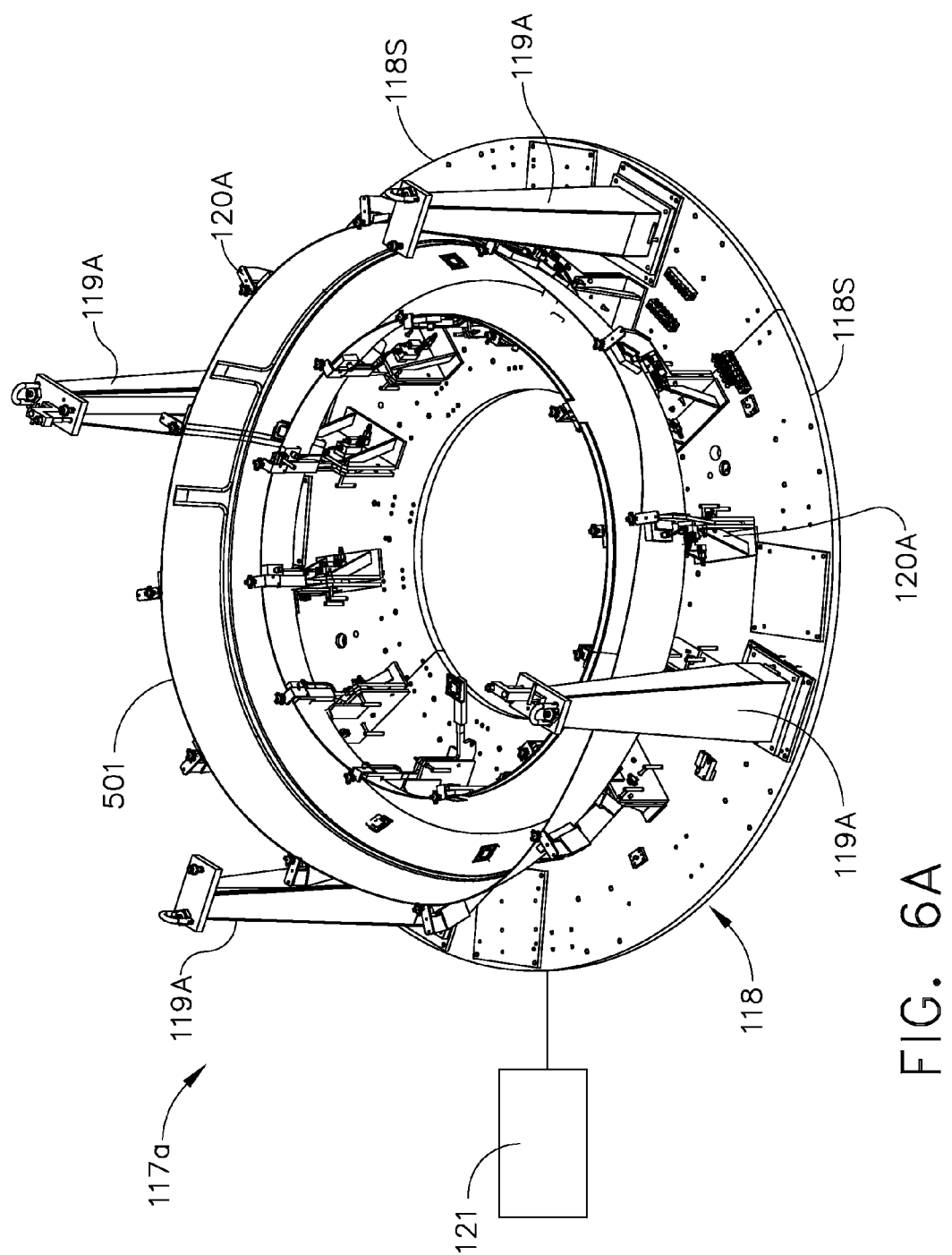
Figure 6B:
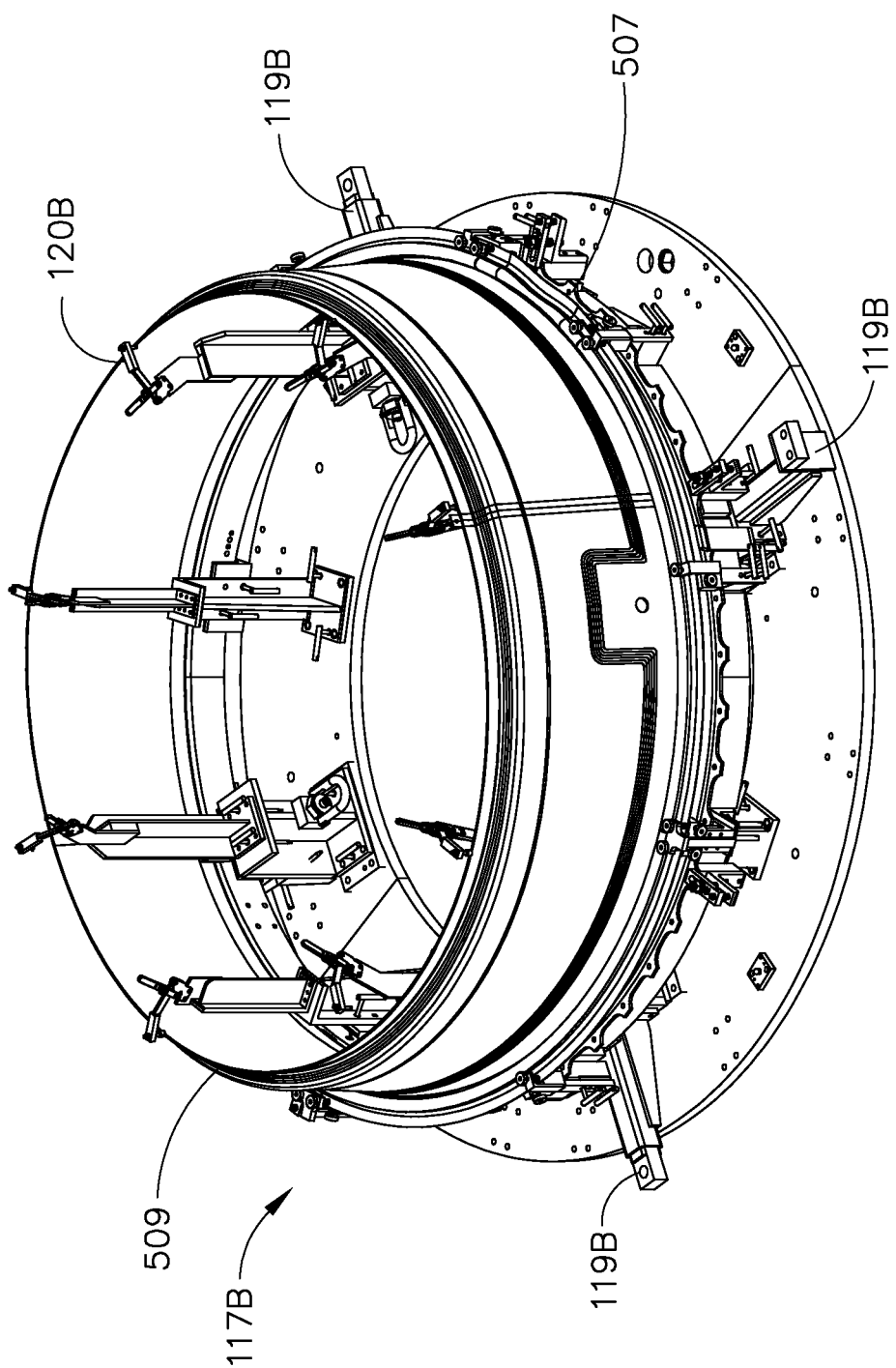
Figure 6C:
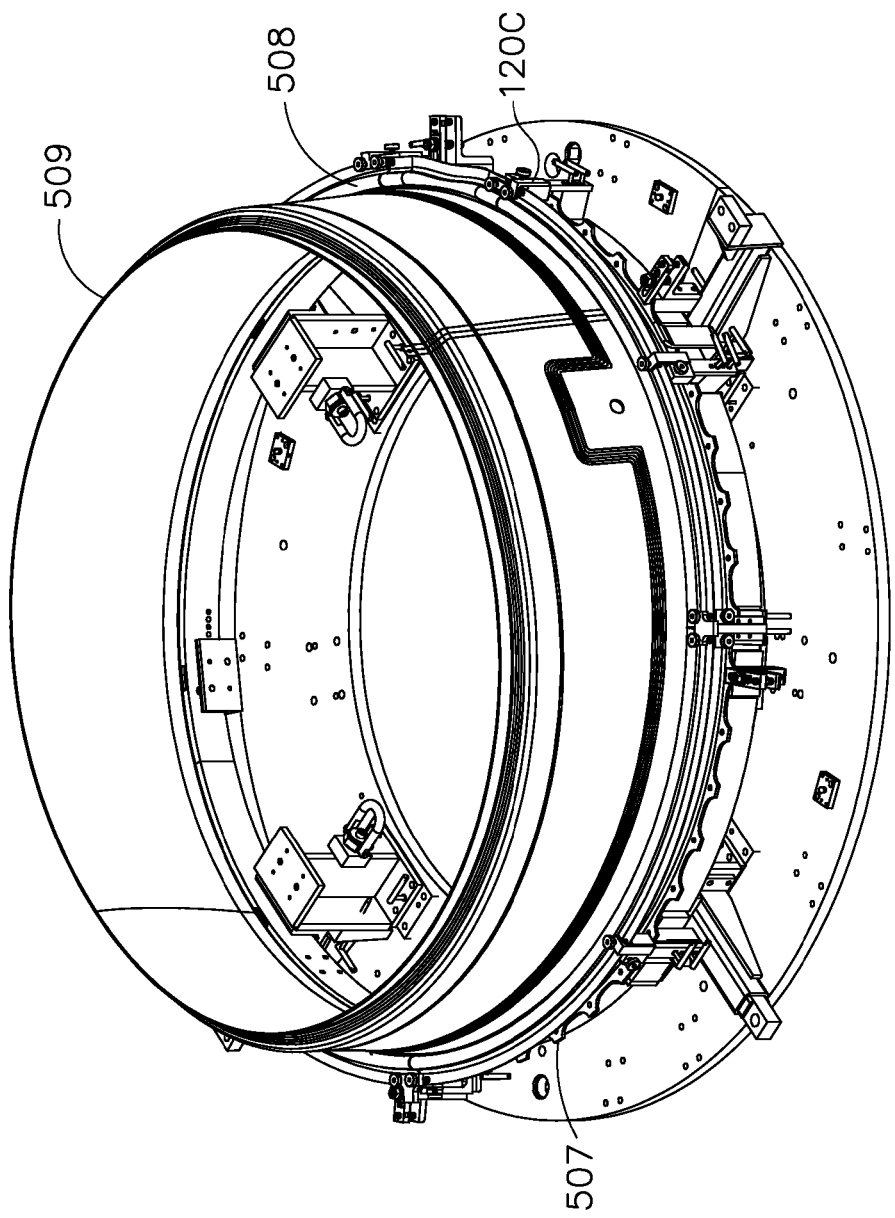
Figure 6D:
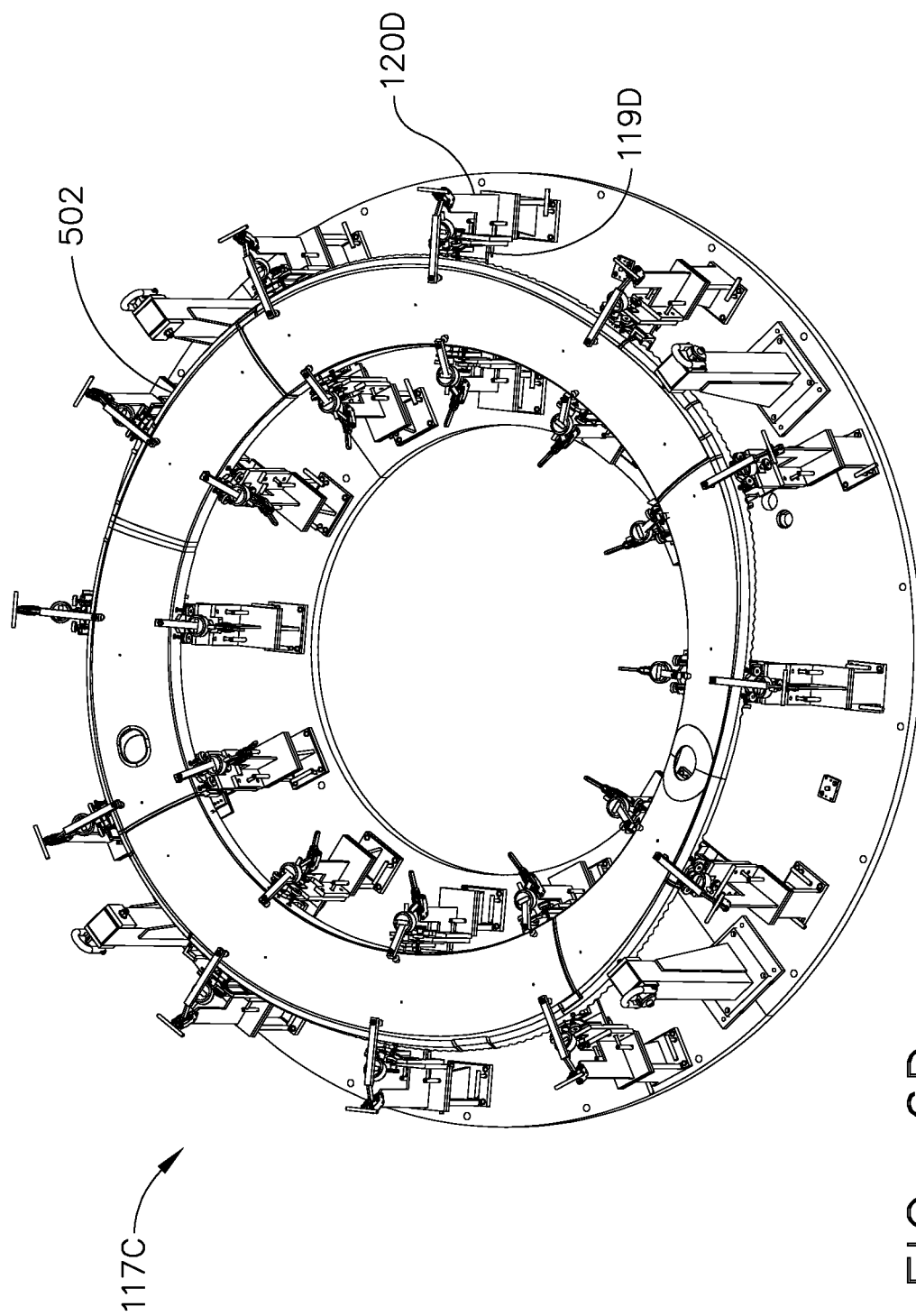
Figure 6F:
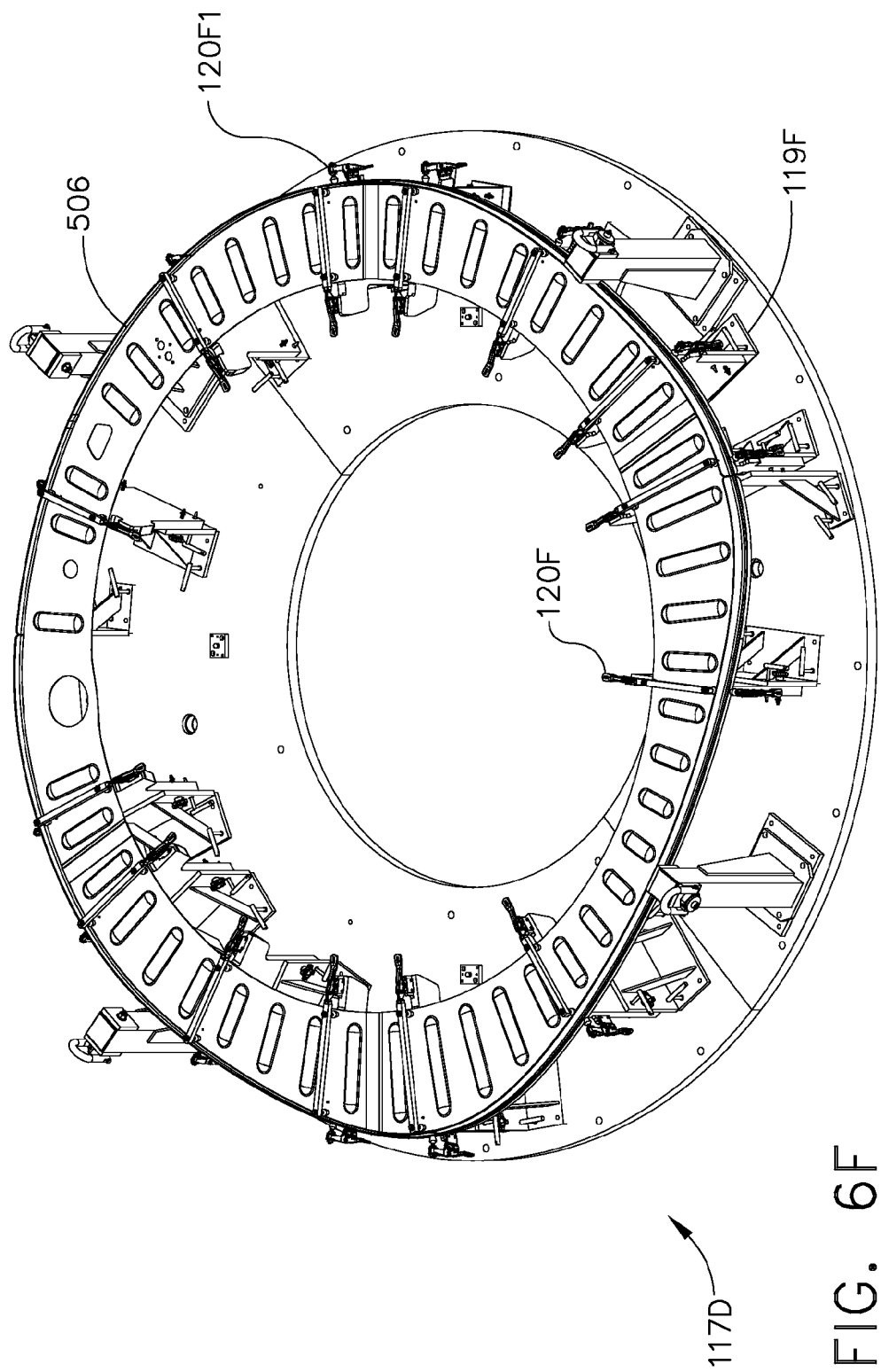
Figure 6G:
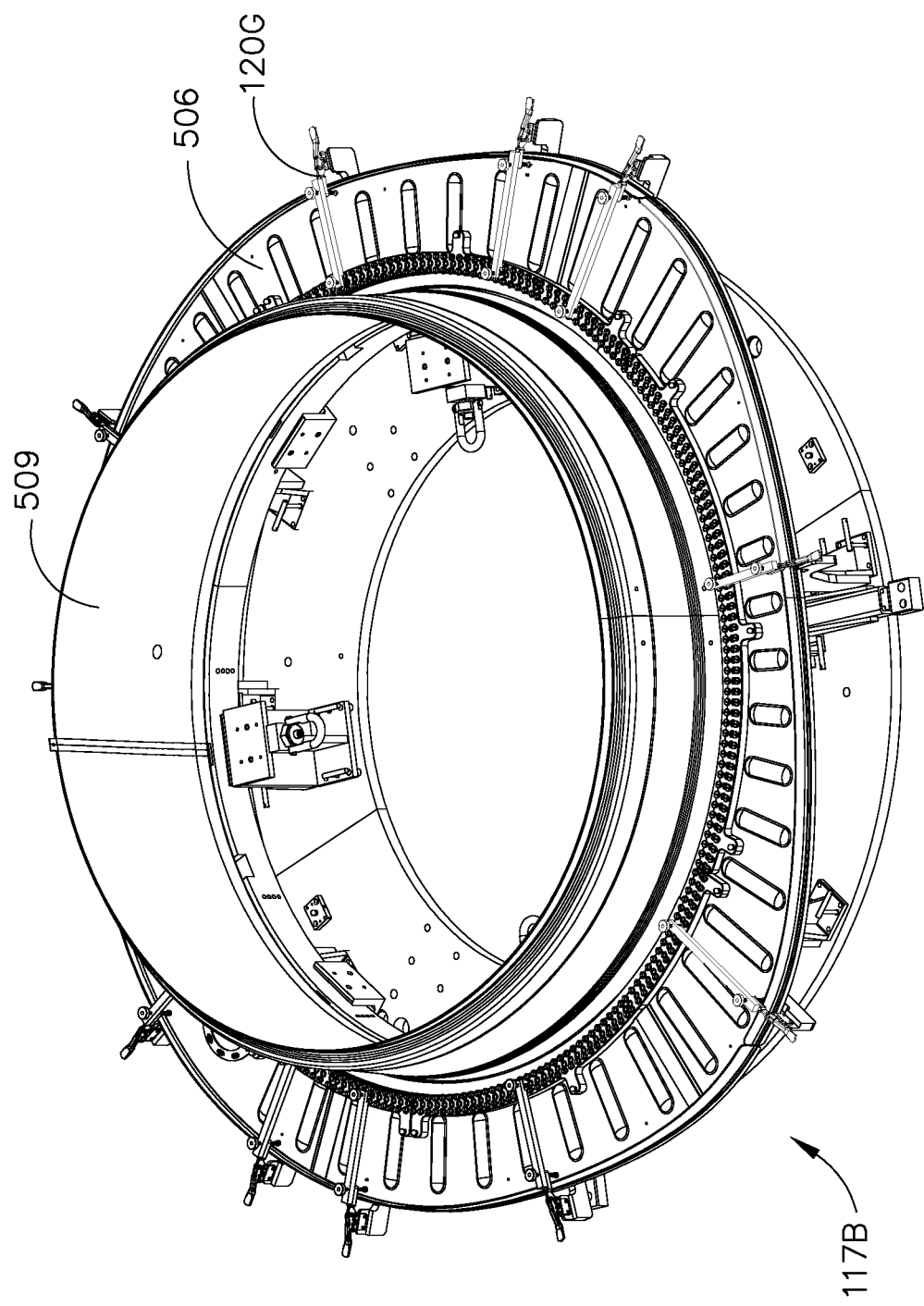
Figure 6H:
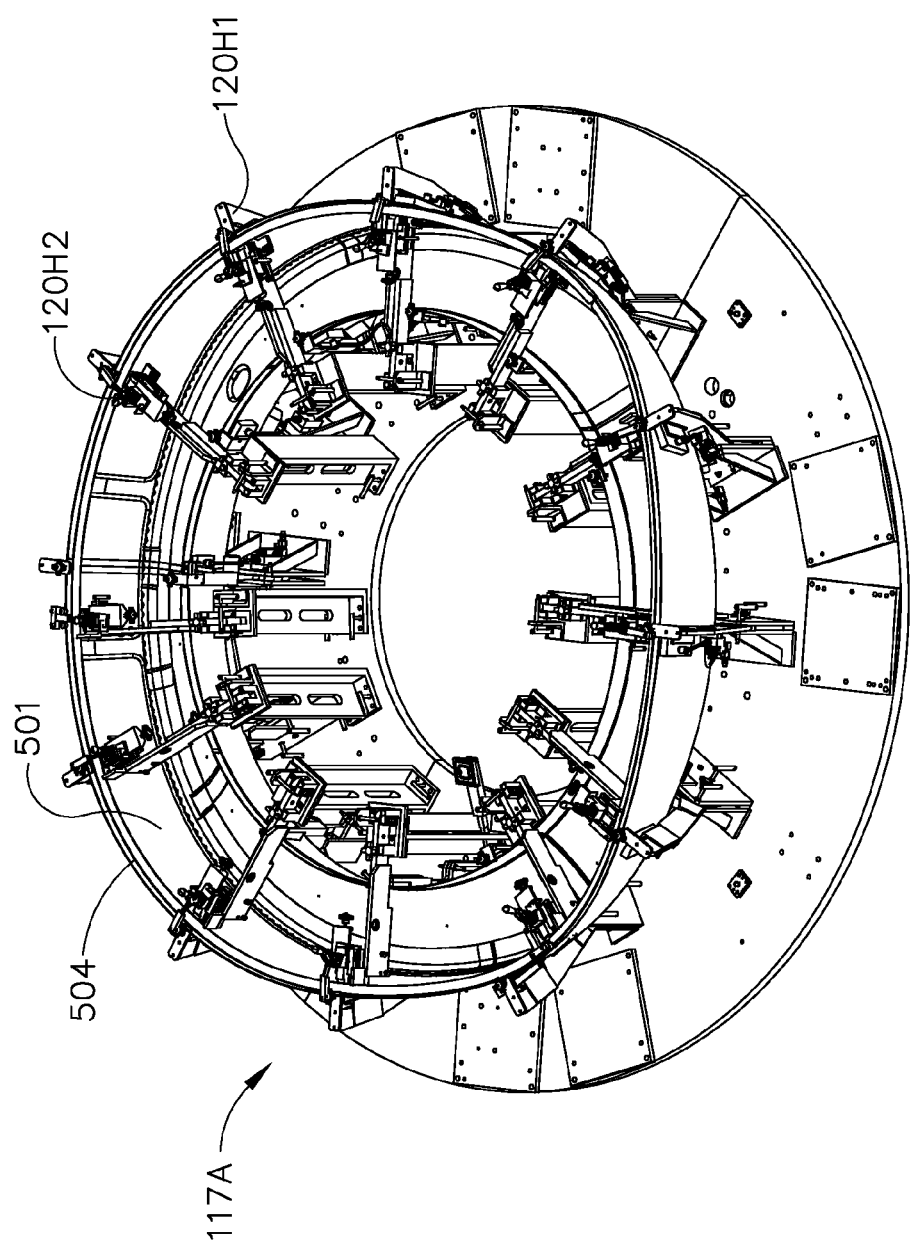
Figure 61:
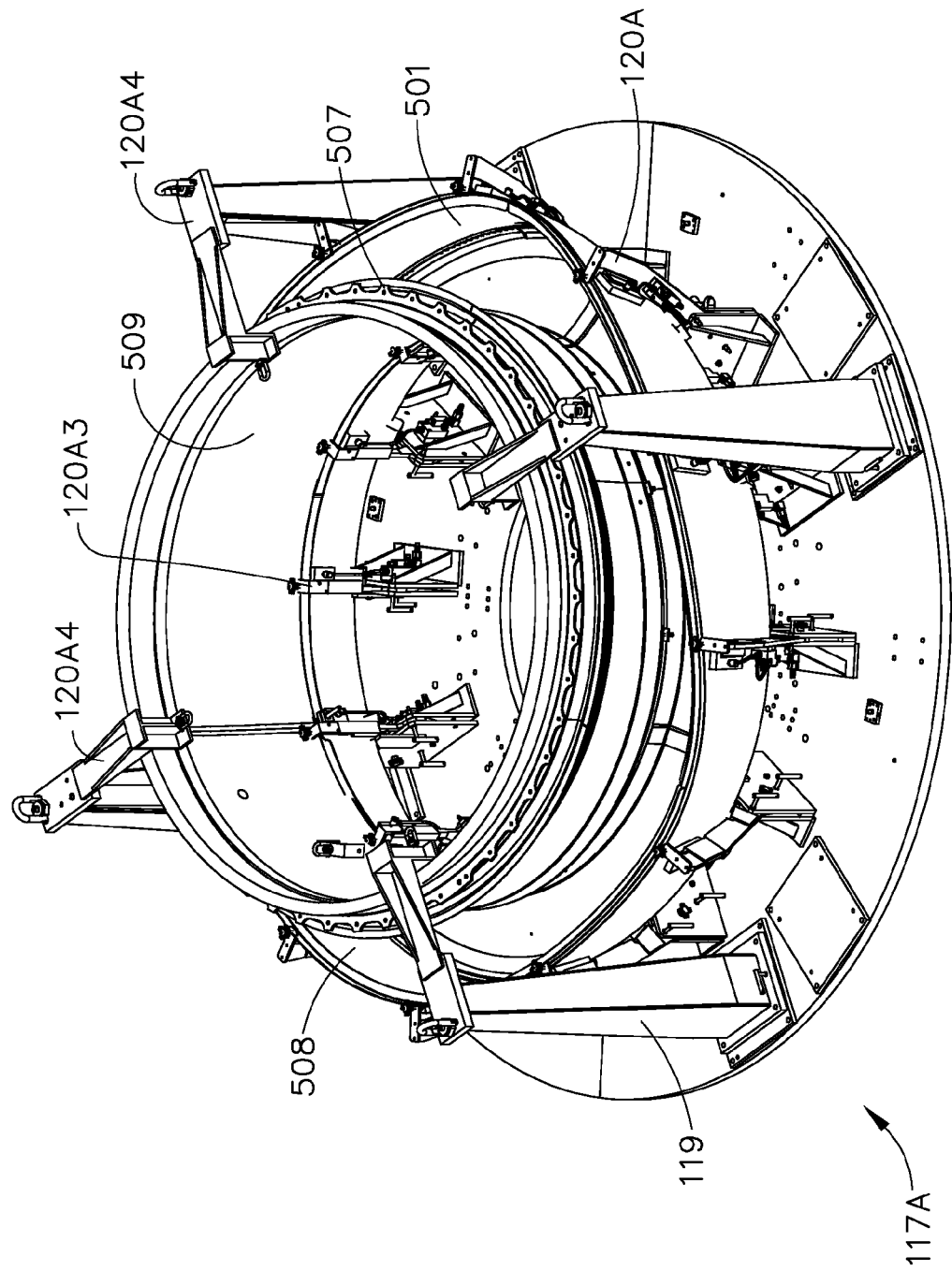
Figure 6J:
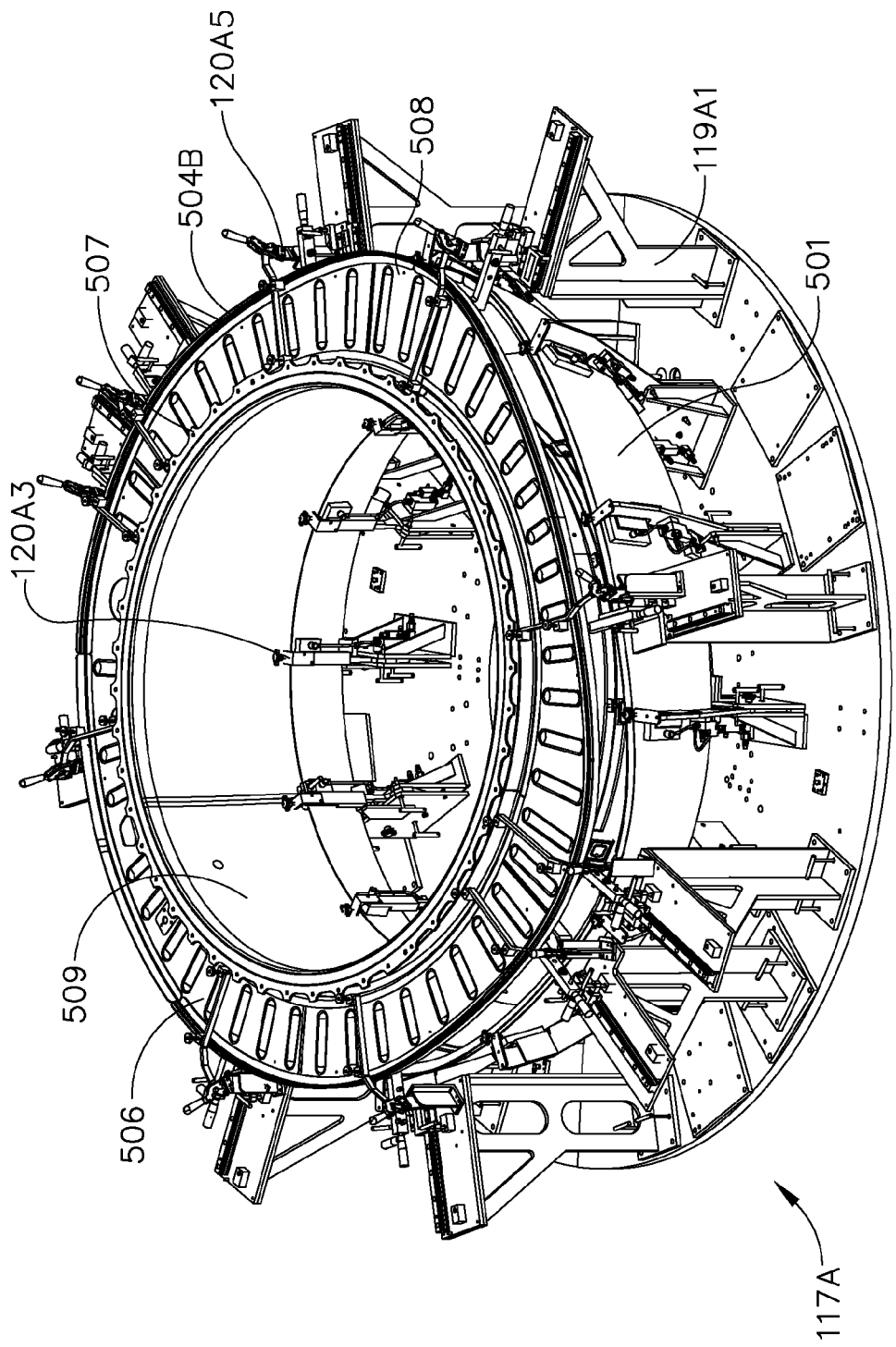
Figure 6K:
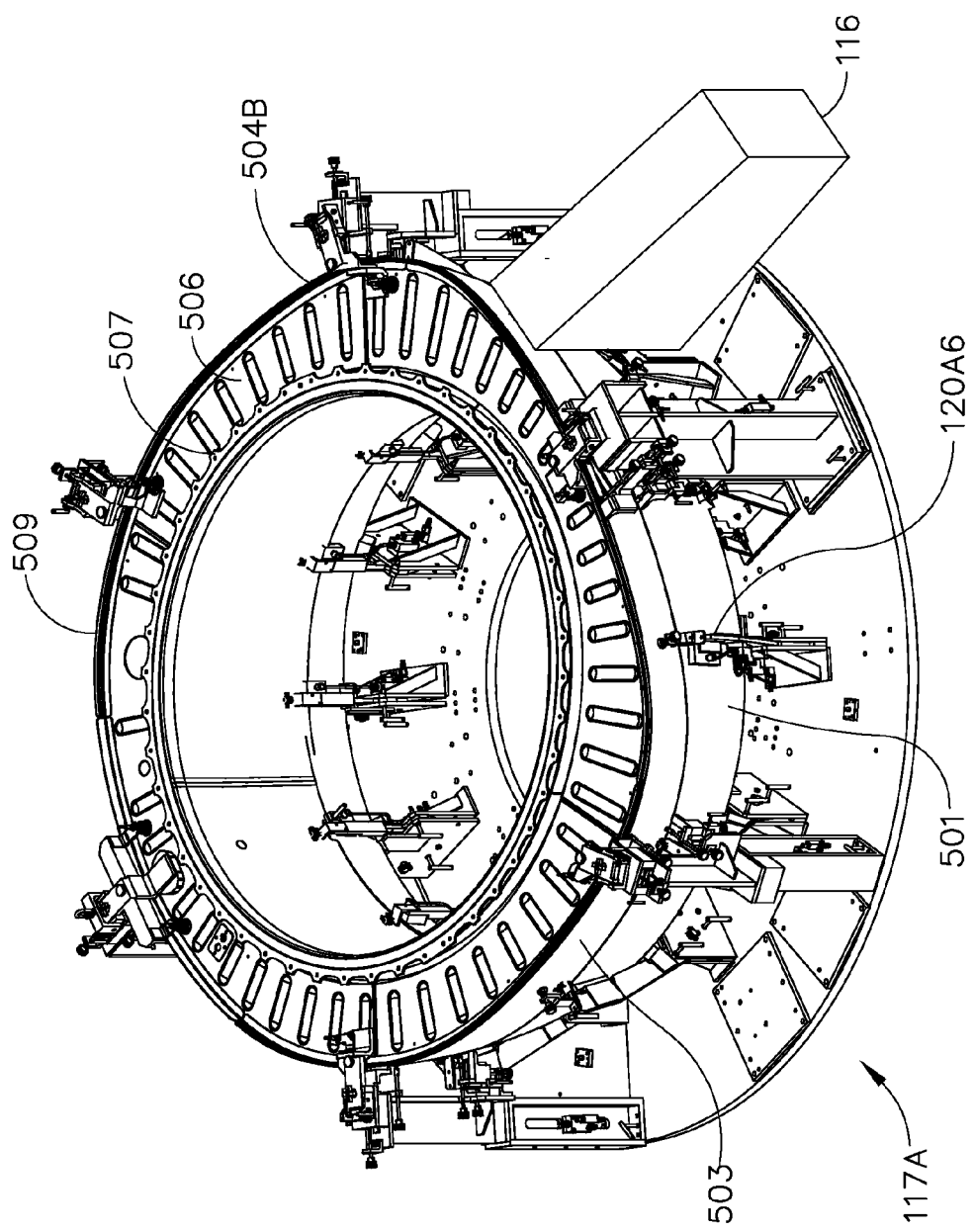
Figure 7:
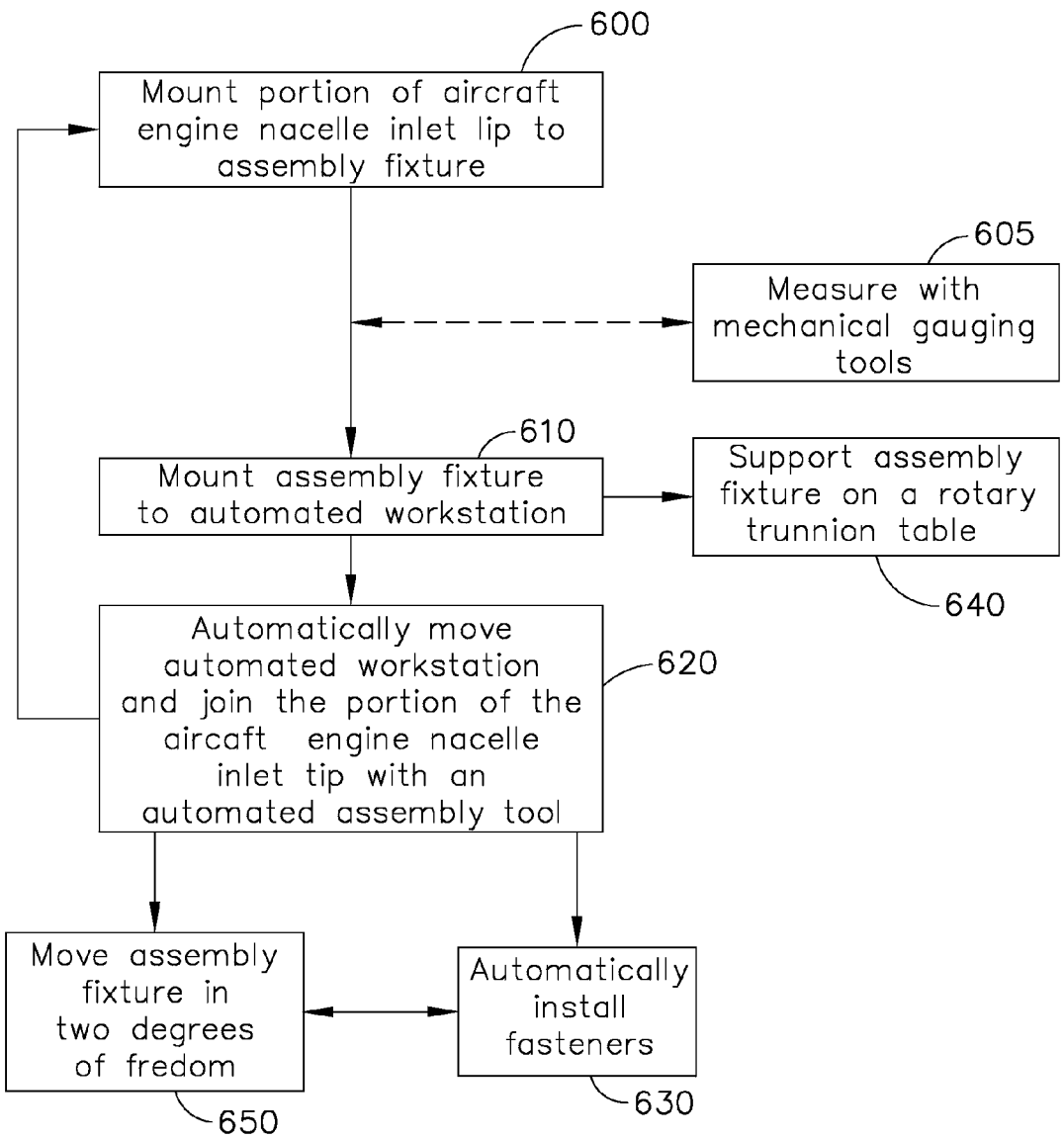
Figure 8:
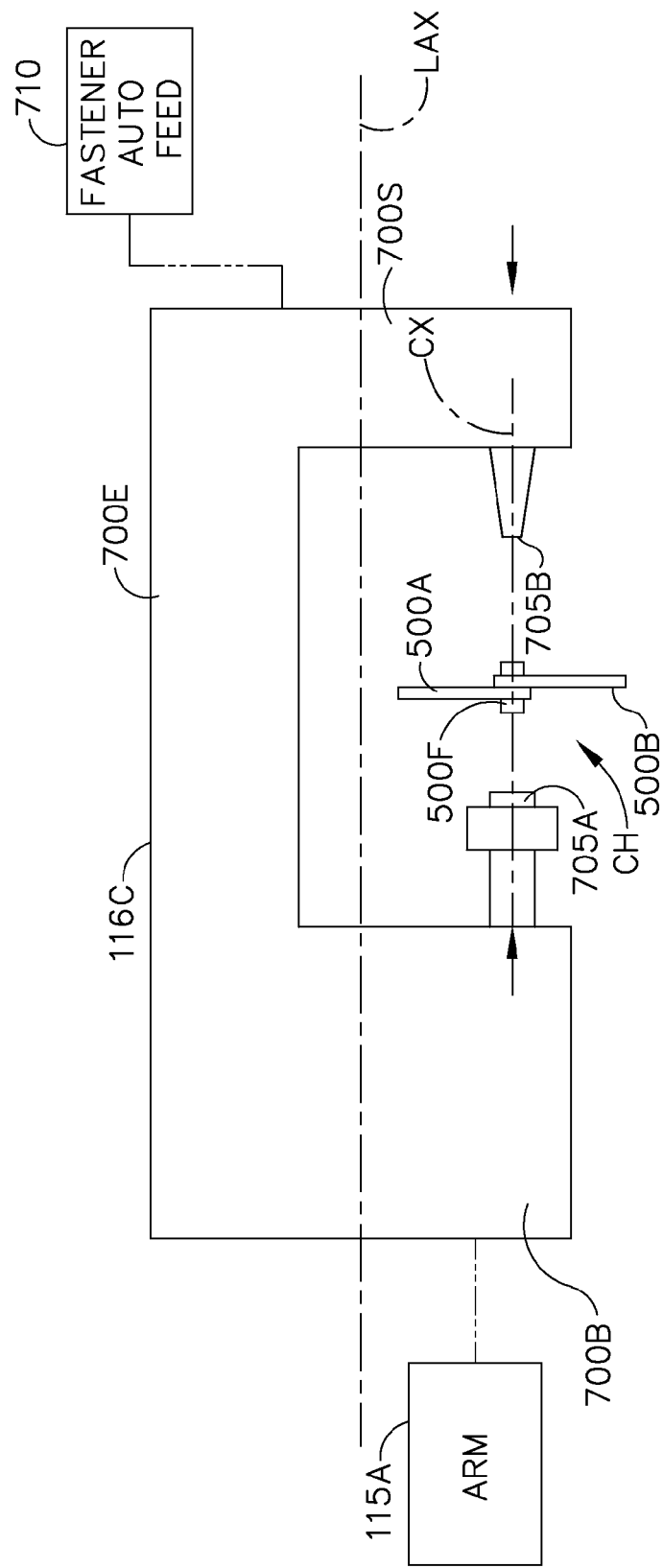
Figure 9A:
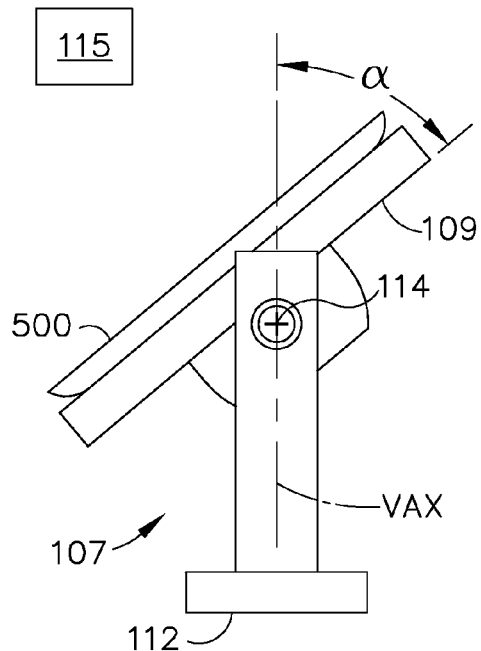
Figure 9B:
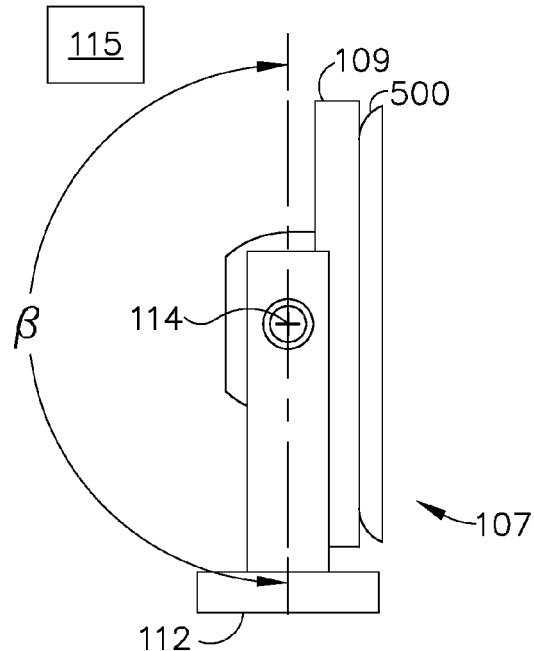
Figure 9C:
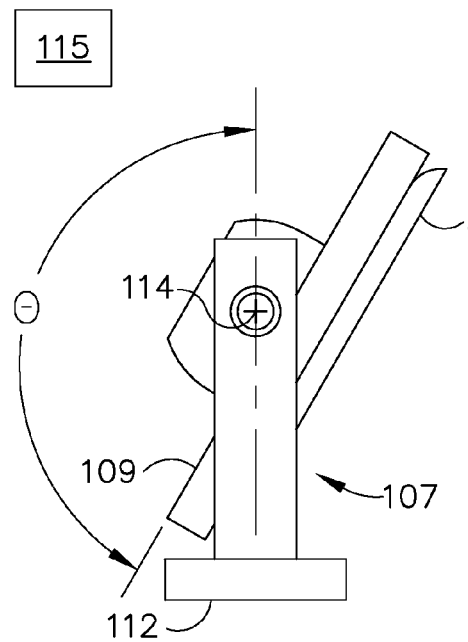
Figure 9D:
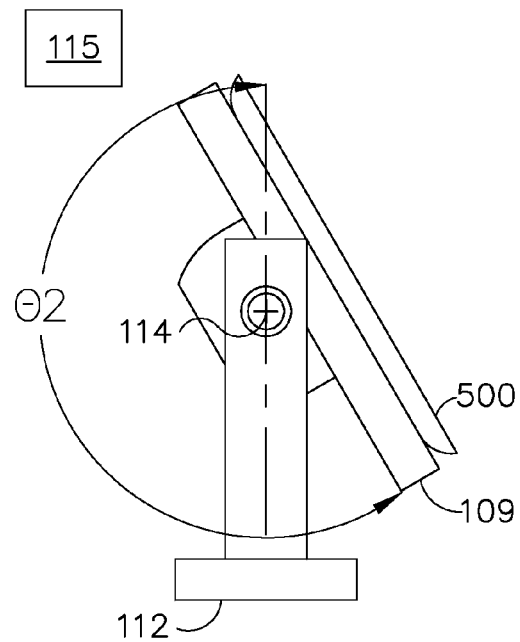
Figure 10:
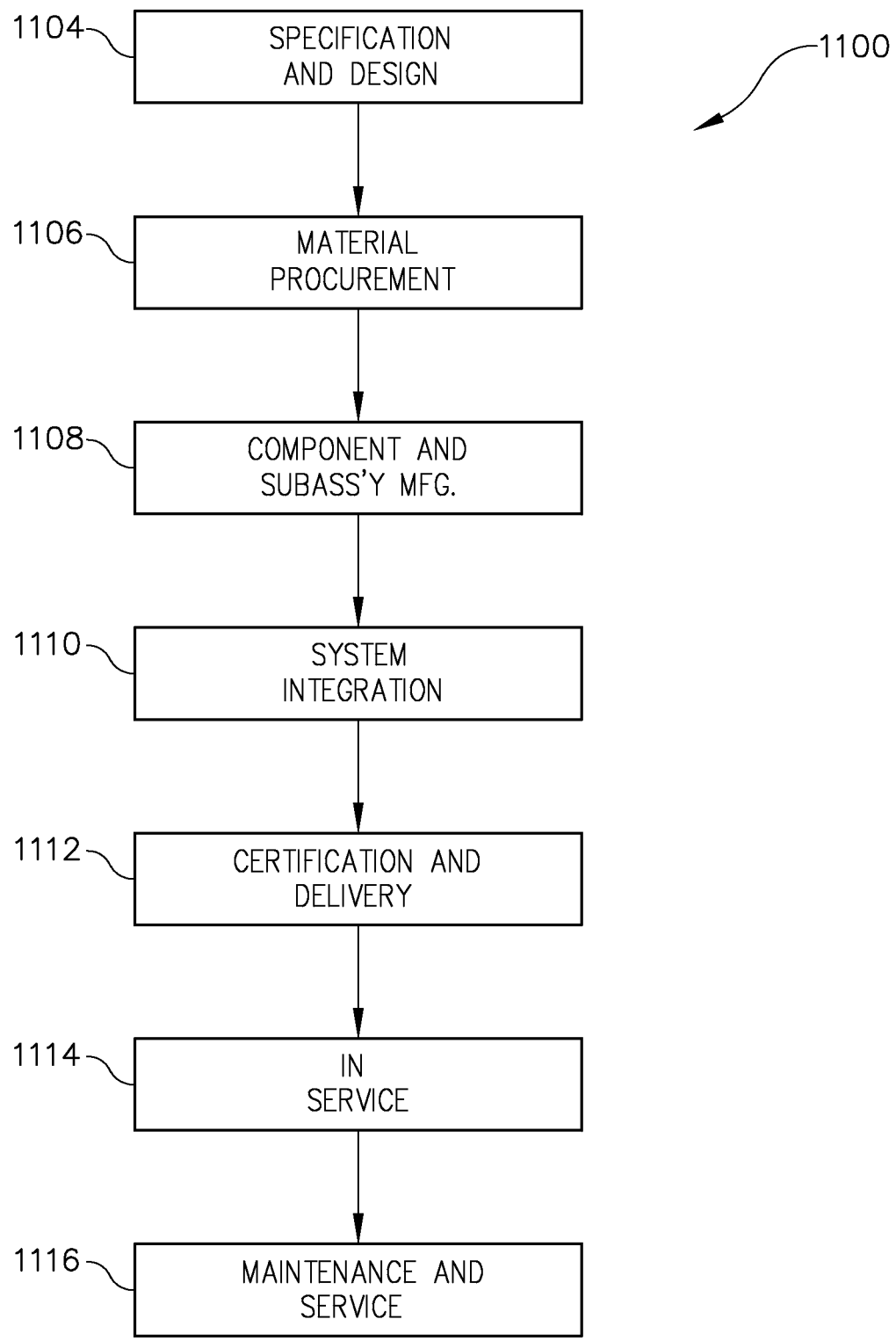

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of an aircraft engine inlet assembly apparatus, according to one aspect of the present disclosure;

FIG. 2 is a diagrammatic representation of an exemplary aircraft engine nacelle inlet lip, according to one aspect of the disclosure;

FIG. 3 is a diagrammatic representation of the aircraft engine inlet assembly apparatus, according to one aspect of the present disclosure;

FIG. 4 is a diagrammatic representation of the aircraft engine inlet assembly apparatus, according to one aspect of the present disclosure;

FIG. 5A is a diagrammatic representation of a portion of the aircraft engine inlet assembly apparatus, according to one aspect of the present disclosure;

FIG. 5B is a diagrammatic representation of a portion of the aircraft engine inlet assembly apparatus, according to one aspect of the present disclosure;

FIG. 6A is a diagrammatic representation of an assembly fixture of the aircraft engine inlet assembly apparatus, according to one aspect of the present disclosure;

FIG. 6B is a diagrammatic representation of an assembly fixture of the aircraft engine inlet assembly apparatus, according to one aspect of the present disclosure;

FIG. 6C is a diagrammatic representation of the assembly fixture illustrated in FIG. 6B having a different configuration, according to one aspect of the present disclosure;

FIG. 6D is a diagrammatic representation of an assembly fixture of the aircraft engine inlet assembly apparatus, according to one aspect of the present disclosure;

FIG. 6E is a diagrammatic representation of the assembly fixture illustrated in FIG. 6A having a different configuration, according to one aspect of the present disclosure;

FIG. 6F is a diagrammatic representation of an assembly fixture of the aircraft engine inlet assembly apparatus, according to one aspect of the present disclosure;

FIG. 6G is a diagrammatic representation of the assembly fixture illustrated in FIG. 6B having a different configuration, according to one aspect of the present disclosure;

FIG. 6H is a diagrammatic representation of the assembly fixture illustrated in FIG. 6A having a different configuration, according to one aspect of the present disclosure;

FIG. 6I is a diagrammatic representation of the assembly fixture illustrated in FIG. 6A having a different configuration, according to one aspect of the present disclosure;

FIG. 6J is a diagrammatic representation of the assembly fixture illustrated in FIG. 6A having a different configuration, according to one aspect of the present disclosure;

FIG. 6K is a diagrammatic representation of the assembly fixture illustrated in FIG. 6A having a different configuration, according to one aspect of the present disclosure;

FIG. 7 is a flow diagram illustrating the assembly of an aircraft engine inlet, according to one aspect of the present disclosure;

FIG. 8 is a diagrammatic representation of a portion of an automated assembly tool, according to one aspect of the present disclosure;

FIGS. 9A-9D are diagrammatic representations of the portion of the aircraft engine inlet assembly apparatus shown in FIGS. 5A and 5B in various assembly positions, according to one aspect of the present disclosure;

FIG. 10 is a flow diagram of aircraft production and service methodology; and

Figure 11:
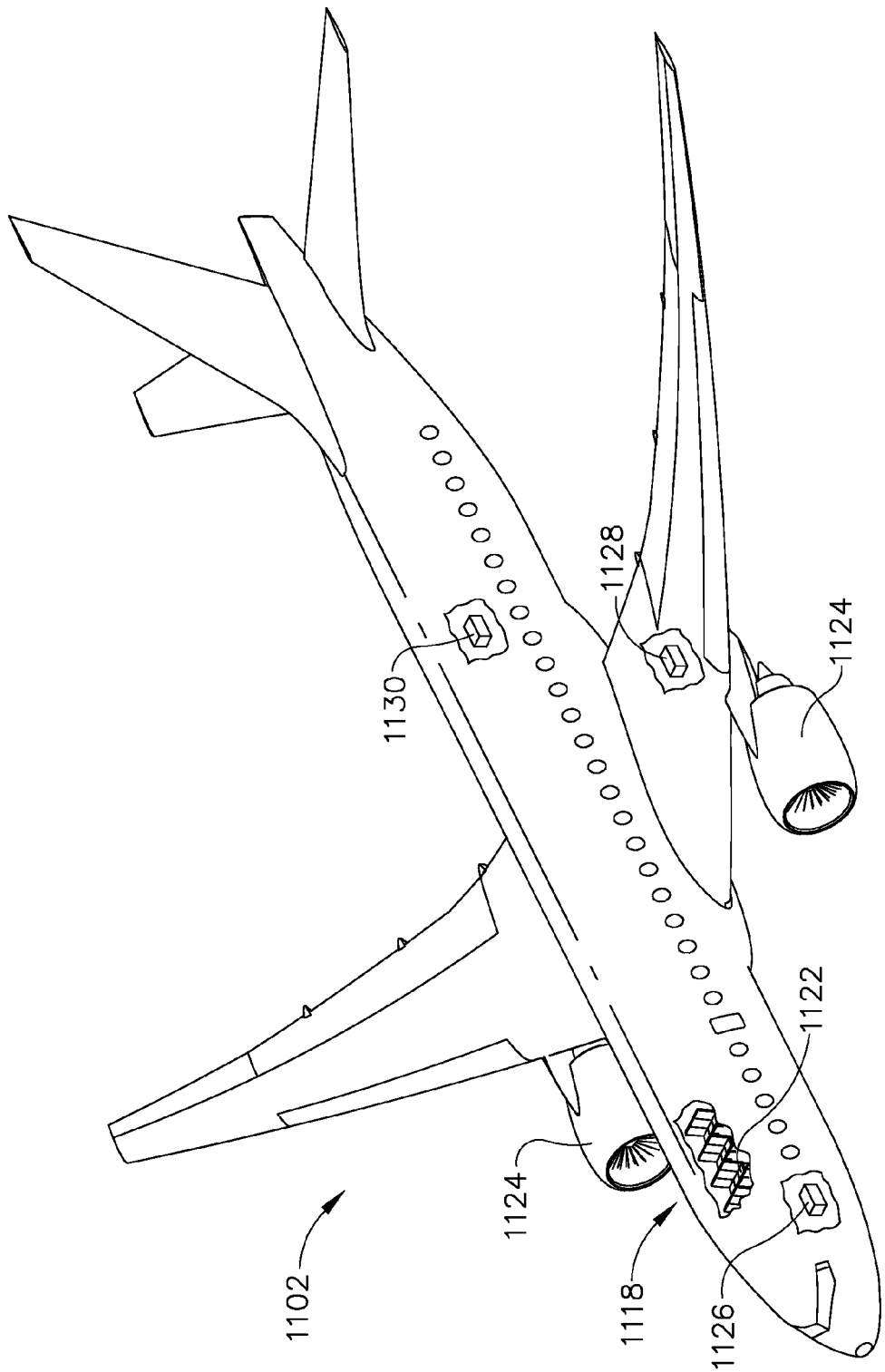

FIG. 11 is a diagrammatic representation of an aircraft.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring generally to FIGS. 1 and 2, and particularly to FIG. 2 an aircraft engine nacelle inlet lip 500 includes a plurality of components that are fastened together to form the aircraft engine nacelle inlet lip 500. For exemplary purposes only the aircraft engine inlet includes a lipskin 501, a forward bulkhead 502, an outer barrel 503, an inner barrel 509, an aft attachment ring 507, one or more chord members 504A, 504B, an aft bulkhead 506 and an inner angle member 508 (generally referred to herein as "inlet components"). These inlet components are connected to each other through respective joints A, B, C, E, F, G, H, I, J, K, L as shown in FIG. 2 and as described in greater detail below. It should be understood that, in other aspects, the aircraft engine inlet includes any suitable number of inlet components each having any suitable shape and being connected to each other through any suitable number and type of joint. In accordance with the aspects of the disclosure described herein, the joints A, B, C, E, F, G, H, I, J, K, L are connected in a predetermined ordered assembly in an automated process with the aircraft engine inlet assembly apparatus/system 100 illustrated in FIG. 1.

In one aspect, the aircraft engine inlet assembly apparatus/system 100 includes a controller 103, an aircraft engine nacelle inlet lip assembly cell 104 and an operator workstation 101. The controller 103 is any suitable controller that is connected to the operator workstation 101 and the aircraft engine nacelle inlet lip assembly cell 104. The controller 103 is configured or otherwise programmed to control operations of the operator workstation 101 and the aircraft engine nacelle inlet lip assembly cell 104 in the manner described herein to effect assembly of the joints A, B, C, E, F, G, H, I, J, K, L in the predetermined ordered assembly.

Referring now to FIGS. 1, 3, 4 and 5A, the aircraft engine nacelle inlet lip assembly cell 104 illustrated in the Figs. is representative only and it should be understood that, in other aspects, the aircraft engine nacelle inlet lip assembly cell has any suitable configuration. For exemplary purposes only, the aircraft engine nacelle inlet lip assembly cell 104 includes a perimeter barrier 105, an automated workstation 107, an automated assembly tool 115, a plurality of assembly fixtures 117A-117n and assembly fixture stands 106 corresponding to each of the plurality of assembly fixtures 117A-117n. As will be describe below, the plurality of assembly fixtures 117A-117n are each configured to hold one or more respective portions of the aircraft engine nacelle inlet lip, at least one of the plurality of fixtures being a common fixture that is common to more than one assembly step of the aircraft engine nacelle inlet lip, where the common fixture is removed from and reinstalled to an articulated assembly fixture docking station 108 during assembly of the aircraft engine nacelle inlet lip 500.

The perimeter barrier 105 extends around and forms a perimeter for automated workstation 107, the automated assembly tool 115, the plurality of assembly fixtures 117A-117n and the corresponding assembly fixture stands 106. The perimeter barrier 105 includes one or more access gates 105G configured to allow an operator maintenance access within the aircraft engine nacelle inlet lip assembly cell 104. As may be realized, in one aspect, any suitable interrupters 105S are connected to the one or more access gates 105G (and the controller 103) and are configured to (through the controller 103) halt operation of the aircraft engine nacelle inlet lip assembly cell 104 when the one or more gates 105G are opened. The interrupters 105S include one or more of a lockout-tagout station, light curtains, proximity switches, or any other suitable detection device that detects when the one or more gates 105G are opened.

The automated workstation 107 has an articulated assembly fixture docking station 108 an automated assembly tool 115 configured to interface with the articulated assembly fixture docking station 108. The articulated assembly fixture docking station 108 includes a two degree of freedom movement, and coupling features 110. In one aspect the coupling features are configured to interchangeably couple each of the plurality of assembly fixtures 117A-117n to the assembly fixture docking station 108. In other aspects the coupling features are configured to interchangeably couple different configurations of each of the plurality of assembly fixtures 117A-117 to the assembly fixture docking station 108. The articulated assembly fixture docking station 108 includes a rotary trunnion table 109 that is rotatable about a first axis of rotation 111. In one aspect the rotary trunnion table 109 is a servo driven rotatory trunnion table while in other aspects the rotary trunnion table is driven in any suitable manner by any suitable drive mechanical or electrical drive. The automated workstation 107 includes at least one stanchion 112 and an articulated assembly fixture docking station support 113 extending from the at least one stanchion 112. The articulated assembly fixture docking station support is connected to the at least one stanchion 112 so as to be rotatable about a second axis of rotation 114 that is angled relative to the first axis of rotation 111. In one aspect, the second axis of rotation 114 is substantially perpendicular to the first axis of rotation 111 while in other aspects the first axis of rotation 111 and the second axis of rotation 114 have any suitable spatial relationship relative to each other.

The automated assembly tool 115 is configured to interface with an assembly fixture 117, of the plurality of assembly fixtures 117A-117n, coupled to articulated assembly fixture docking station 108. The automated assembly tool 115 is configured to join the one or more respective portions of the aircraft engine nacelle inlet lip 500 to each other. In one aspect, the automated assembly tool 115 is any suitable assembly robot having any suitable number of degrees of freedom. The automated assembly tool includes a robotic arm 115A and a plurality of interchangeable end effectors 116A-116n for connection to the robotic arm 115A, each being configured for a respective assembly task. As can be seen in FIG. 4, the automated assembly tool 115 is mounted on a pedestal 115P adjacent to the rotary trunnion table 109 so as to posture the automated assembly tool 115 relative to the rotary trunnion table 109 (and the assembly fixture 117 coupled thereto) to enable the automated assembly tool 115 to perform fastening of one or more of the joints A, B, C, E, F, G, H, I, J, K, L of the aircraft engine nacelle inlet lip 500 as at least a portion of the aircraft engine nacelle inlet lip 500 is rotated about one or more of the first axis 111 and second axis 114. As will be described in greater detail below, automated workstation 107 is configured to, under the control of controller 103, to automatically positon the articulated assembly fixture docking station 108, in two degrees of freedom, in at least two predetermined joining or assembly positions (as described below with respect to, e.g. FIGS. 9A-9D) so that the automated assembly tool has access to one or more of the joints A, B, C, E, F, G, H, I, J, K, L for preparing and/or fastening the joint(s). In one aspect, the controller 103 is connected to the automated workstation 107 and automated assembly tool 115 and is configured to effect the two degree of freedom positioning of the articulated assembly fixture docking station 108 in the at least two predetermined joining positions, where the controller effects an interface between the automated assembly tool and at least one of the plurality of assembly fixtures disposed on the articulated assembly fixture docking station in the at least two predetermined joining positions, and the at least two joining positions effect an ordered assembly of at least a forward bulkhead joint (e.g. joint B), a forward bulkhead to lipskin joint (e.g. collectively joints A and C), a chord member to lipskin joint (e.g. joint E), an inner barrel to lipskin joint (e.g. joint L), an aft bulkhead to lipskin joint (e.g. collectively joints H and I) and an outer barrel to lipskin joint (e.g. collectively Joints F and G). In one aspect the order of assembly of the joints is forming the forward bulkhead joint, forming the forward bulkhead to lipskin joint, forming the chord member to lipskin joint, forming the inner barrel to lipskin joint, forming the aft bulkhead to lipskin joint and forming the outer barrel to lipskin joint.

The operator workstation 101 is positioned relative to the articulated assembly fixture docking station 108 to provide operator access to the articulated assembly fixture docking station 108 through the perimeter barrier 105. The operator workstation 101 includes at least one operator zone 102A-102n and one or more interrupters 101S1 which in one aspect are substantially similar to the interrupter 105S described above. At least one of the interrupters 10151 is included within an operator zone 102C so as to prevent operation of the aircraft engine nacelle inlet lip assembly cell 104 when an operator is located within the operator zone 102C. The operator zone 102C, in one aspect, allows an operator to interface with the assembly fixture docking station 108 (and an assembly fixture 117 connected thereto) while the automated assembly tool 115 and/or the automated workstation 107 remain immobile. In one aspect the operator workstation includes assembly activation station(s) 101A located within another operator zone 102B that allows an operator presence within the operator zone 102B to commence operations of the aircraft engine nacelle inlet lip assembly cell 104. The operator zone 102A provides an area in which the operator moves freely during operation of the aircraft engine nacelle inlet lip assembly cell 104. In one aspect the operator workstation 101 also includes an emergency stop station 101S2 (which in one aspect is located in operator zone 102A) that is configured to halt operation of the aircraft engine nacelle inlet lip assembly cell 104. As can be seen in FIG. 4 the operator workstation 101 also includes operator zone 102D located within the perimeter barrier 105. The operator zone 102D provides access to the automated workstation 107 and/or the automated assembly tool 115 through the gate 105G. It is noted that the configuration of the operator workstation 101 described herein is exemplary and in other aspects the operator workstation 101 has any suitable configuration and any suitable number of operator zones 102A-102n.

Referring to FIGS. 1 and 6A-6K the plurality of assembly fixtures 117A-117n are configured to hold one or more respective portions of the aircraft engine nacelle inlet lip 500 as will be described in greater detail below. As will also be described below, each of the assembly fixtures 117A-117n correspond to an assembly step of the aircraft engine nacelle inlet lip 500 and at least one of the fixtures is a common fixture that is common to more than one assembly step of the aircraft engine nacelle inlet lip 500. Referring in particular to FIGS. 1 and 6A, each of the plurality of assembly fixtures 117A-117n (assembly fixture 117A is illustrated in FIG. 6A for exemplary purposes only) includes a base 118 having a plurality of arc sections 118S configured in a circumferential arrangement. In one aspect, each of the plurality of assembly fixtures 117A-117n also includes a plurality of docking raisers 119A-119n arranged in a circumferential arrangement where the plurality of docking raisers 119A-119n are configured to support one or more respective portions of the aircraft engine nacelle inlet lip 500. In one aspect each of the plurality of assembly fixtures 117A-117n includes one or more clamps 120A-120n configured to clamp the one or more respective portions of the aircraft engine nacelle inlet lip 500 to a respective assembly fixture 117A-117n. In one aspect, at least one assembly fixture, such as for example assembly fixture 117A, of the plurality of assembly fixtures 117A-117n is a common assembly fixture configured to hold the one or more respective portions of the aircraft engine nacelle inlet lip 500 at multiple stages of assembly as will be described below. As may be realized, the at least one the common assembly fixture, such as for example, assembly fixture 117A, includes one or more of docking raisers 119A-119n and clamps 120A-120n that are configured for selective coupling to the at least one assembly fixture 117A-117n. In one aspect, one or more of the assembly fixtures 117A-117n, such as for example, assembly fixture 117A includes mechanical gauging tools 121 to measure any suitable dimensions of the aircraft engine nacelle inlet lip 500 such as, for example, an inner dimension of the lipskin 501 where those mechanically acquired dimensions are transferred to a subsequently used assembly fixture, such as for example, a forward bulkhead assembly fixture 117C (FIG. 6D). In one aspect the mechanical gauging tools 121 are movably connected to the base 118 so that the mechanical gauging tools 121 are rotated or flipped between a measuring position and a retracted position. In other aspects, the mechanical gauging tools are connected to the base 118 by a slide or in any other suitable manner for moving the mechanical gauging tools between the measuring positon and the retracted position.

Referring now to FIGS. 1, 2, 3, 6A-6K and 8 an exemplary assembly operation for the aircraft engine nacelle inlet lip 500 will be described. In one aspect, at least a portion of an aircraft engine nacelle inlet lip 500 is mounted to one of a plurality assembly fixtures 117A-117n, where each of the assembly fixtures 117A-117n corresponds to an assembly step of the aircraft engine nacelle inlet lip 500 (FIG. 7, Block 600). As will be described below, the one of the plurality of assembly fixtures 117A-117n is mounted on the articulated assembly fixture docking station 108 of the automated workstation 107 (FIG. 7, Block 610) and the one of the plurality of assembly fixtures 117A-117n is automatically moved with the automated workstation 107 so that the automated assembly tool 115 joins the at least a portion of the aircraft engine nacelle inlet lip 500 mounted on the one of the plurality of assembly fixtures 117A-117n (FIG. 7, Block 620). In one aspect, joining the at least a portion of the aircraft engine nacelle inlet lip 500 to the at least another portion of the aircraft engine nacelle inlet lip 500 includes automatically installing fasteners 500F in a predetermined number of joints A, B, C, E, F, G, H, I, J, K, L between the at least a portion 500A of the aircraft engine nacelle inlet lip 500 and the at least another portion 500B of the aircraft engine nacelle inlet lip 500 (FIG. 7, Block 630). In one aspect, mounting the one of the plurality of assembly fixtures 117A-117n on an articulated assembly fixture docking station 108 of the automated workstation 107 includes supporting the one of the plurality assembly fixtures on a rotary trunnion table 109 (FIG. 7, Block 640). In one aspect automatically moving the one of the plurality of assembly fixtures 117A-117n with the automated workstation 107 includes moving the one of the plurality of assembly fixtures 117A-117n in two degrees of freedom about the first axis of rotation 111 and the second axis of rotation 114 (FIG. 7, Block 650).

For example, in one aspect, referring to FIG. 6A the lipskin 501 is connected to assembly fixture 117A (the "lipskin assembly tool") in any suitable manner, such as with docking raisers 119A and clamps 120A. In one aspect, the lipskin 501 is connected to the assembly fixture 117A with the assembly fixture 117A located on, for example, a respective assembly fixture stand 106 or in any other suitable location. The mechanical gauging tools 121 are positioned to measuring at least one dimension of the aircraft engine nacelle inlet lip 500, such as the inner dimension of the lipskin 501, and the at least one dimension is transferred to the forward bulkhead assembly fixture 117C (FIG. 7, Block 605). It should be understood that measurement of the lipskin 501 inner dimension and transferring that dimension to the assembly fixture 117C (the "forward bulkhead assembly tool") is described for exemplary purposes and in other aspects any suitable dimensions for any suitable inlet components can be measured with the mechanical gauging tools 121 (mounted to any one of the assembly fixtures 117A-117n) and transferred to one or more of the other assembly fixtures 117A-117n. FIG. 6B illustrates the inner barrel 509 connected to assembly fixture 117B (the "inner barrel assembly tool") with docking raisers 119B and clamps 120B to position, and form joint K. As can be seen in FIG. 6B the aft attach ring 507 is mounted to the inner barrel 509 in any suitable manner while the inner barrel 509 is located on the assembly fixture 117B. In other aspects the aft attach ring 507 is mounted to the inner barrel 509 when the inner barrel 509 is located at any suitable location. The inner angle member 508 is mounted to the inner barrel 509 with clamps 120C to form joint J. In one aspect the joints J and K are fastened at any suitable point in the assembly of the aircraft engine nacelle inlet lip 500 such as for example, joint K may be fastened when the aft attachment ring 507 is mounted to the inner barrel 509, joint J may be fastened when the inner angle member 508 is mounted to the aft attachment ring 507 and/or one or more of joints J and K may be fastened when the aft bulkhead to lipskin joint (described below) is fastened. As can be seen in FIGS. 6B and 6C the assembly fixture 117B is a common assembly fixture having more than one assembly tool configuration such that at least clamps 120B, 120C are coupled to and decoupled from the assembly fixture 117B depending on the inlet component being assembled.

Referring to FIG. 6D the forward bulkhead 502 is mounted to assembly fixture 117C with clamps 120D and docking raisers 119D so as to form and fasten joint B (e.g. the forward bulkhead joint). The assembly fixture 117C is mounted to the rotary trunnion table 109. FIG. 5B illustrates an exemplary assembly fixture 117 mounted to the rotary trunnion table 109. As can be seen in FIG. 5B the rotary trunnion table 109 and the assembly fixture 117 include a central aperture AP sized and shaped to allow automated assembly tool 115 access to the portions of the aircraft engine nacelle inlet lip 500 mounted to the assembly fixture 117. The automated workstation is controlled, such as by controller 103, to rotate the rotary trunnion table 109 and the assembly fixture mounted thereto about one or more of the first axis of rotation 111 and the second axis of rotation 114 and the automated assembly tool 115 performs at least one operation (e.g. drilling, deburring, reaming, inserting fasteners, etc.) on the forward bulkhead 502. The assembly fixture 117C is removed from the trunnion table 109 and the forward bulkhead is transferred to the assembly fixture 117A for connection to the lipskin 501 with clamps 120A1, 120A2 so as to form joints A and C. The assembly fixture 117A is mounted to the rotary trunnion table 109 so that the automated assembly tool 115 performs at least one operation (e.g. drilling, deburring, reaming, inserting fasteners, etc.) to fasten joints A and C (e.g. collectively referred to as the forward bulkhead to lipskin joint).

Referring to FIG. 6F, the aft bulkhead 506 and chord member 504B are mounted to assembly fixture 117D and the assembly fixture 117D with clamps 120F, 120F1 and docking raisers 119F. The assembly fixture 117D is mounted to the rotary trunnion table 109. The automated workstation is controlled to rotate the rotary trunnion table 109 and the assembly fixture mounted thereto about one or more of the first axis of rotation 111 and the second axis of rotation 114 and the automated assembly tool 115 performs at least one operation (e.g. drilling, deburring, reaming, inserting fasteners, etc.) on the aft bulkhead 506 and chord member 504B to, for example, prepare and form joint H. Referring also to FIG. 6G, the aft bulkhead 506 is removed from assembly fixture 117D and mounted to common assembly fixture 117B with clamps 120G. The assembly fixture 117B is mounted to the rotary trunnion table 109. The automated workstation is controlled to rotate the rotary trunnion table 109 and the assembly fixture mounted thereto about one or more of the first axis of rotation 111 and the second axis of rotation 114 and the automated assembly tool performs one or more operations (e.g. drilling, deburring, reaming, inserting fasteners, etc.) on the inner barrel 509 (to which the aft attach ring 507 and inner angle member 508 are connected) and/or the aft bulkhead to, for example, prepare joint I. The assembly fixture 117B is removed from the rotary trunnion table 109.

Referring to FIG. 6H, the assembly fixture 117A, which is also a common assembly fixture, is mounted to the rotary trunnion table 109 (with the lipskin 501 and forward bulkhead 502 mounted thereto). The chord member 504A is connected to the lipskin 501 with clamps 120H1, 120H2 (either before or after mounting the assembly fixture 117A on the rotary trunnion table 109). The automated workstation is controlled to rotate the rotary trunnion table 109 and the assembly fixture mounted thereto about one or more of the first axis of rotation 111 and the second axis of rotation 114 and the automated assembly tool 115 performs at least one operation (e.g. drilling, deburring, reaming, inserting fasteners, etc.) on one or more of the chord member 504A and lipskin 501 to form and fasten joint E (e.g. the chord member to lipskin joint). In one aspect the assembly fixture 117A is removed from the rotary trunnion table 109 while in other aspects the assembly fixture remains on the rotary trunnion table 109 for subsequent assembly operations.

Referring to FIG. 6I, the inner barrel 509 (with the aft attach ring 507 and inner angle member 508 attached) are mounted to assembly fixture 117A (either before or after mounting the assembly fixture 117A on the rotary trunnion table 109) with docking raisers 119 and clamps 120A4, 120A3. The automated workstation is controlled to rotate the rotary trunnion table 109 and the assembly fixture mounted thereto about one or more of the first axis of rotation 111 and the second axis of rotation 114 and the automated assembly tool 115 performs at least one operation (e.g. drilling, deburring, reaming, inserting fasteners, etc.) on one or more of the inner barrel 509 and lipskin 501 to form and fasten joint L (e.g. the inner barrel to lipskin joint). In one aspect the assembly fixture 117A is removed from the rotary trunnion table 109 while in other aspects the assembly fixture remains on the rotary trunnion table 109 for subsequent assembly operations.

Referring to FIG. 6J, the aft bulkhead 506 and chord member 504B are mounted to the assembly fixture 117A (either before or after mounting the assembly fixture 117A on the rotary trunnion table 109) with docking raisers 119A1 and clamps 120A5. The automated workstation is controlled to rotate the rotary trunnion table 109 and the assembly fixture mounted thereto about one or more of the first axis of rotation 111 and the second axis of rotation 114 and the automated assembly tool 115 performs at least one operation (e.g. drilling, deburring, reaming, inserting fasteners, etc.) on one or more of the aft bulkhead 506, chord member 504B, inner barrel 509 and lipskin 501 to form and fasten joints I and H (e.g. collectively referred to as the aft bulkhead to lipskin joint). In one aspect the assembly fixture 117A is removed from the rotary trunnion table 109 while in other aspects the assembly fixture remains on the rotary trunnion table 109 for subsequent assembly operations.

Referring to FIG. 6K, the outer barrel 503 is mounted to the assembly fixture 117A (either before or after mounting the assembly fixture 117A on the rotary trunnion table 109) with clamps 120A6. The automated workstation is controlled to rotate the rotary trunnion table 109 and the assembly fixture mounted thereto about one or more of the first axis of rotation 111 and the second axis of rotation 114 and the automated assembly tool 115 performs at least one operation (e.g. drilling, deburring, reaming, inserting fasteners, etc.) on one or more of the chord member 504B and chord member 504A to form and fasten joints F and G (e.g. collectively referred to as the outer barrel to lipskin joint). The assembly fixture 117A is removed from the rotary trunnion table 109 and the assembled aircraft engine nacelle inlet lip 500 is removed from the assembly fixture 117A.

As noted above, the automated assembly tool 115 includes one or more end effectors 116A-116n that are interchangeably mounted to the arm 115A. At least one of the end effectors 116C is configured to at least insert a fastener 500F and support (e.g. apply a counter pressure against the fastener insertion pressure) portions 500A, 500B of the aircraft engine nacelle inlet lip 500 being joined so that the joint is formed in a one-up assembly. In one aspect the end effector 116C is a multi-function end effector configured to one or more of drill, ream, deburr, countersink, insert fasteners and secure the fastener for effecting the one-up assembly. For example, one or more of the joints A, B, C, E, F, G, H, I, J, K, L are formed such that a portion 500A, 500B of the aircraft engine nacelle inlet lip 500 is supported by the end effector 116C while the end effector 116C inserts a fastener through the portions 500A, 500B and fastens the portions 500A, 500B together. As can be seen in FIG. 8, in one aspect the end effector includes a generally C-shaped frame having a base portion 700B (for coupling the end effector to the arm 115A), an extension portion 700E extending from and being dependent from the base portion 700B and a support portion 700S that extends from the extension portion 700E so as to be generally parallel with the base portion 700B. The base portion 700B, the extension portion 700E and the support portion 700S are arranged to form a channel CH into which the portions 500A, 500B of the aircraft engine nacelle inlet lip 500 are positioned for preparing and/or fastening at last one of the joints A, B, C, E, F, G, H, I, J, K, L. The base portion 700B includes a fastener interface member 705A and the support portion 700S includes a support member 705B that are arranged in opposing directions along a common axis CX so that the portions 500A, 500B are supported by the end effector support member 705B while the fastener interface member 705A inserts and fastens the fastener 500F for forming one or more of the joints A, B, C, E, F, G, H, I, J, K, L. As may be realized, in one aspect the end effector 116C includes any suitable fastener feeding unit 710 that supplies fasteners, as needed, to the fastener interface member 705A.

As also noted above, the automated workstation 107 is positioned (e.g. in at least two joining positions) in two degrees of freedom for positioning the portions 500A, 500B of the aircraft engine nacelle inlet lip 500 mounted thereon for automated assembly tool access to one or more of the joints A, B, C, E, F, G, H, I, J, K, L. Referring to FIGS. 9A-9D, exemplary predetermined joining positions of the automated workstation 107 are illustrated. It is noted that in FIGS. 9A-9D a home position or an automated workstation position having an angle of zero is when the rotary trunnion table 109 is substantially aligned with (e.g. parallel to) axis VAX (which is in one aspect a vertical axis of the automated workstation 107) and so that the aircraft engine nacelle inlet lip 500 faces the automated assembly tool 115. In one aspect the automated workstation 107 is positioned so that the rotary trunnion table 109 is positioned at an angle $\alpha$ for fastening at least joints B, E, H. In one aspect the angle $\alpha$ is about 50° from the home position while in other aspects the angle $\alpha$ is more or less than about 50°. In one aspect the automated workstation 107 is positioned so that the rotary trunnion table 109 is positioned at an angle $\beta$ for fastening at least joint C. In one aspect the angle $\beta$ is about 180° from the home position while in other aspects the angle $\alpha$ is more or less than about 180°. In one aspect the automated workstation 107 is positioned so that the rotary trunnion table 109 is positioned at an angle $\theta$ for fastening at least joints A and L. In one aspect the angle $\theta$ is about 150° from the home position while in other aspects the angle $\alpha$ is more or less than about 150°. In one aspect the automated workstation 107 is positioned so that the rotary trunnion table 109 is positioned at an angle $\theta 2$ for fastening at least joints F, G, J and K. In one aspect the angle $\theta 2$ is about 210° from the home position while in other aspects the angle $\alpha$ is more or less than about 210°. As may be realized, the automated workstation 107 is positioned so that the rotary trunnion table 109 is positioned at a fixture interchange orientation for allowing an operator to interchange one assembly fixture 117A-117n with another assembly fixture 117A-117n in any suitable manner. In one aspect the fixture interchange orientation includes a position of the automated workstation where the rotary trunnion table 109 is positioned at one or more of angles $\alpha, \beta, \theta, \theta 2$ while in other aspects the rotary trunnion table is positioned at any suitable angle for interchanging assembly fixtures. It is noted that the automated workstation joining positions described above are exemplary only and in other aspects may be different than those described depending on, for example, a location of the automated assembly tool 115, the configuration of the automated assembly tool 115 and end effectors 116A-116n mounted thereto.

As may be realized, any one or more of the above assembly operations, in one aspect, can be performed manually with the assembly fixtures 117A-117n located on their respective assembly fixture stand 106.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 1100 as shown in FIG. 10 and an aircraft 1102 as shown in FIG. 11. During pre-production, illustrative method 1100 may include specification and design 1104 of the aircraft 1102 and material procurement 1106. During production, component and subassembly manufacturing 1108 and system integration 1110 of the aircraft 1102 take place. Thereafter, the aircraft 1102 may go through certification and delivery 1112 to be placed in service 1114. While in service by a customer, the aircraft 1102 is scheduled for routine maintenance and service 1116 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11, the aircraft 1102 produced by the illustrative method 1100 may include an airframe 1118 with a plurality of high-level systems and an interior 1122. Examples of high-level systems include one or more of a propulsion system 1124, an electrical system 1126, a hydraulic system 1128, and an environmental system 1130. Any number of other systems may be included. Although an aerospace example is shown, the principles of the disclosure may be applied to other industries, such as the automotive industry.

Apparatus and methods shown or described herein may be employed during any one or more of the stages of the aircraft manufacturing and service method 1100. For example, components or subassemblies corresponding to component and subassembly manufacturing 1108 may be fabricated or manufactured in a manner similar to components or subassemblies produced while the aircraft 1102 is in service. Also, one or more aspects of the apparatus, method, or combination thereof may be utilized during the production states 1108 and 1110, for example, by substantially expediting assembly of or reducing the cost of an aircraft 1102. Similarly, one or more aspects of the apparatus or method realizations, or a combination thereof, may be utilized, for example and without limitation, while the aircraft 1102 is in service, e.g., maintenance and service 1116.

In accordance with one or more aspects of the disclosed embodiment a method for assembling an aircraft engine nacelle inlet lip, having a lipskin, a forward bulkhead, an outer barrel, an inner barrel, an aft attachment ring, one or more chord members, an aft bulkhead and an inner angle member, includes, with a controller of an automated workstation, automatically positioning an articulated assembly fixture docking station of the automated workstation in at least two predetermined joining positions, where the articulated docking station is positioned in two degrees of freedom, and effecting, with the controller, an ordered assembly of at least a forward bulkhead joint, a forward bulkhead to lipskin joint, a chord member to lipskin joint, an inner barrel to lipskin joint, an aft bulkhead to lipskin joint and an outer barrel to lipskin joint through an interface between an automated assembly tool and at least one of a plurality of assembly fixtures interchangeably mounted on the articulated assembly fixture docking station in the at least two predetermined joining positions, where each of the assembly fixtures corresponds to an assembly step of the aircraft engine nacelle inlet lip and at least one of the assembly fixtures is a common fixture that is common to more than one assembly step of the aircraft engine nacelle inlet lip.

In accordance with one or more aspects of the disclosed embodiment the plurality of assembly fixtures includes a forward bulkhead assembly tool, the method further comprising measuring at least one dimension of the aircraft engine nacelle inlet lip with mechanical gauging tools and transferring the at least one dimension to the forward bulkhead assembly tool.

In accordance with one or more aspects of the disclosed embodiment assembly of each joint includes at least automatically installing fasteners between one portion of the aircraft engine nacelle inlet lip and at least another portion of the aircraft engine nacelle inlet lip.

In accordance with one or more aspects of the disclosed embodiment the method further includes holding, with the common fixture, one or more of the lipskin, the forward bulkhead, the outer barrel, the inner barrel, the aft attachment ring, the one or more chord members, the aft bulkhead and the inner angle member at multiple stages of assembly where the common fixture is removed from and reinstalled to the articulated assembly fixture docking station during assembly of the aircraft engine nacelle inlet lip.

In accordance with one or more aspects of the disclosed embodiment the method further includes forming at least one of the joints with an end effector of the automated assembly tool that interfaces with the aircraft engine nacelle inlet lip in opposing directions along a common axis such that the aircraft engine nacelle inlet lip is supported by the end effector while forming the at least one of the joints with the end effector.

In accordance with one or more aspects of the disclosed embodiment the ordered assembly includes an assembly order of forming the forward bulkhead joint, forming the forward bulkhead to lipskin joint, forming the chord member to lipskin joint, forming the inner barrel to lipskin joint, forming the aft bulkhead to lipskin joint and forming the outer barrel to lipskin joint.

In accordance with one or more aspects of the disclosed embodiment the method further includes effecting, with the controller, positioning of the articulated assembly fixture docking station in a predetermined assembly fixture interchange position between at least two of the predetermined joining positions so that one of the plurality of assembly fixtures is interchanged with another of the plurality of assembly fixtures.

In accordance with one or more aspects of the disclosed embodiment an aircraft engine inlet assembly apparatus, for assembling an aircraft engine nacelle inlet lip having a lipskin, a forward bulkhead, an outer barrel, an inner barrel, an aft attachment ring, one or more chord members, an aft bulkhead and an inner angle member, includes a plurality of assembly fixtures configured to hold one or more respective portions of the aircraft engine nacelle inlet lip, at least one of the plurality of fixtures being a common fixture that is common to more than one assembly step of the aircraft engine nacelle inlet lip; an automated workstation having an articulated assembly fixture docking station and an automated assembly tool configured to interface with the articulated assembly fixture docking station, the articulated assembly fixture docking station having a two degree of freedom movement, and coupling features configured to interchangeably couple each of the plurality of assembly fixtures to the assembly fixture docking station; and a controller connected to the automated workstation and automated assembly tool, the controller being configured to effect two degree of freedom positioning of the articulated assembly fixture docking station in at least two predetermined joining positions, wherein the controller effects an interface between the automated assembly tool and at least one of the plurality of assembly fixtures disposed on the articulated assembly fixture docking station in the at least two predetermined joining positions, and the at least two joining positions effect an ordered assembly of at least a forward bulkhead joint, a forward bulkhead to lipskin joint, a chord member to lipskin joint, an inner barrel to lipskin joint, an aft bulkhead to lipskin joint and an outer barrel to lipskin joint.

In accordance with one or more aspects of the disclosed embodiment the aircraft engine nacelle inlet lip comprises a Boeing 737 aircraft engine nacelle inlet lip.

In accordance with one or more aspects of the disclosed embodiment the controller is configured to effect positioning of the articulated assembly fixture docking station in a predetermined assembly fixture interchange position between the at least two of the predetermined joining positions such that one of the plurality of assembly fixtures is interchanged with another of the plurality of assembly fixtures.

In accordance with one or more aspects of the disclosed embodiment the automated assembly tool comprises an end effector configured to interface with the aircraft engine nacelle inlet lip in opposing directions along a common axis such that the end effector supports the engine nacelle inlet lip and effects formation of at least one joint of the aircraft engine nacelle inlet lip.

In accordance with one or more aspects of the disclosed embodiment the aircraft engine inlet assembly apparatus further includes mechanical gauging tools movably connected to one of the plurality of assembly fixtures such that the mechanical gauging tools are one of rotated and flipped between a measuring position and a retracted position to obtain mechanically acquired dimensions of the aircraft engine nacelle inlet lip.

In accordance with one or more aspects of the disclosed embodiment the mechanically acquired dimensions are transferred to another one of the plurality of assembly fixtures to effect assembly of a portion of the aircraft engine nacelle inlet lip.

In accordance with one or more aspects of the disclosed embodiment each of the plurality of assembly fixtures includes a base having a plurality of arc sections configured in a circumferential arrangement.

In accordance with one or more aspects of the disclosed embodiment each of the plurality of assembly fixtures includes a plurality of docking raisers arranged in a circumferential arrangement, the plurality of docking raisers being configured to support the one or more respective portions of the aircraft engine nacelle inlet lip.

In accordance with one or more aspects of the disclosed embodiment each of the plurality of assembly fixtures includes one or more clamps configured to clamp the one or more respective portions of the aircraft engine nacelle inlet lip to a respective assembly fixture.

In accordance with one or more aspects of the disclosed embodiment the common fixture is configured to hold one or more of the lipskin, the forward bulkhead, the outer barrel, the inner barrel, the aft attachment ring, the one or more chord members, the aft bulkhead and the inner angle member at multiple stages of assembly.

In accordance with one or more aspects of the disclosed embodiment the common fixture includes one or more of docking raisers and clamps that are configured for selective coupling to the at least one assembly fixture.

In accordance with one or more aspects of the disclosed embodiment an aircraft engine inlet assembly apparatus, for assembling an aircraft engine nacelle inlet lip having a lipskin, a forward bulkhead, an outer barrel, an inner barrel, an aft attachment ring, one or more chord members, an aft bulkhead and an inner angle member, includes an operator workstation; and an aircraft engine nacelle inlet lip assembly cell in communication with the operator workstation, the aircraft engine nacelle inlet lip assembly cell including a plurality of assembly fixtures configured to hold one or more respective portions of the aircraft engine nacelle inlet lip, at least one of the plurality of fixtures being a common fixture that is common to more than one assembly step of the aircraft engine nacelle inlet lip; an automated workstation having an articulated assembly fixture docking station and an automated assembly tool configured to interface with the articulated assembly fixture docking station, the articulated assembly fixture docking station having a two degree of freedom movement, and coupling features configured to interchangeably couple each of the plurality of assembly fixtures to the assembly fixture docking station; and a controller connected to the automated workstation and automated assembly tool, the controller being configured to effect two degree of freedom positioning of the articulated assembly fixture docking station in at least two predetermined joining positions, where the controller effects an interface between the automated assembly tool and at least one of the plurality of assembly fixtures disposed on the articulated assembly fixture docking station in the at least two predetermined joining positions, and the at least two joining positions effect an ordered assembly of at least a forward bulkhead joint, a forward bulkhead to lipskin joint, a chord member to lipskin joint, an inner barrel to lipskin joint, an aft bulkhead to lipskin joint and an outer barrel to lipskin joint.

In accordance with one or more aspects of the disclosed embodiment the aircraft engine nacelle inlet lip comprises a Boeing 737 aircraft engine nacelle inlet lip.

In accordance with one or more aspects of the disclosed embodiment the controller is configured to effect positioning of the articulated assembly fixture docking station in a predetermined assembly fixture interchange position between the at least two of the predetermined joining positions such that one of the plurality of assembly fixtures is interchanged with another of the plurality of assembly fixtures.

In accordance with one or more aspects of the disclosed embodiment the automated assembly tool comprises an end effector configured to interface with the aircraft engine nacelle inlet lip in opposing directions along a common axis such that the end effector supports the engine nacelle inlet lip and effects formation of at least one joint of the aircraft engine nacelle inlet lip.

In accordance with one or more aspects of the disclosed embodiment the aircraft engine inlet assembly apparatus further includes mechanical gauging tools movably connected to one of the plurality of assembly fixtures such that the mechanical gauging tools are one of rotated and flipped between a measuring position and a retracted position to obtain mechanically acquired dimensions of the aircraft engine nacelle inlet lip.

In accordance with one or more aspects of the disclosed embodiment the mechanically acquired dimensions are transferred to another one of the plurality of assembly fixtures to effect assembly of a portion of the aircraft engine nacelle inlet lip.

In accordance with one or more aspects of the disclosed embodiment each of the plurality of assembly fixtures includes a base having one or more of a plurality of arc sections configured in a circumferential arrangement, a plurality of docking raisers arranged in a circumferential arrangement, the plurality of docking raisers being configured to support the one or more respective portions of the aircraft engine nacelle inlet lip, and one or more clamps configured to clamp the one or more respective portions of the aircraft engine nacelle inlet lip to a respective assembly fixture.

In accordance with one or more aspects of the disclosed embodiment the common fixture is configured to hold one or more of a lipskin, a forward bulkhead, an outer barrel, an inner barrel, an aft attachment ring, one or more chord members, an aft bulkhead and an inner angle member at multiple stages of assembly.

In accordance with one or more aspects of the disclosed embodiment the common fixture includes one or more of docking raisers and clamps that are configured for selective coupling to the at least one assembly fixture.

In accordance with one or more aspects of the disclosed embodiment an aircraft engine inlet assembly system, for assembling an aircraft engine nacelle inlet lip, includes an aircraft engine nacelle inlet lip assembly cell including a plurality of assembly fixtures configured to hold one or more respective portions of the aircraft engine nacelle inlet lip, at least one of the plurality of fixtures being a common fixture that is common to more than one assembly step of the aircraft engine nacelle inlet lip; an automated workstation having an articulated assembly fixture docking station and an automated assembly tool configured to interface with the articulated assembly fixture docking station, the articulated assembly fixture docking station having a two degree of freedom movement, and coupling features configured to interchangeably couple each of the plurality of assembly fixtures to the assembly fixture docking station; and a controller connected to the automated workstation and automated assembly tool, the controller being configured to effect two degree of freedom positioning of the articulated assembly fixture docking station in at least two predetermined joining positions, where the controller effects an interface between the automated assembly tool and at least one of the plurality of assembly fixtures disposed on the articulated assembly fixture docking station in the at least two predetermined joining positions, and the at least two joining positions effect an ordered assembly of at least a forward bulkhead joint, a forward bulkhead to lipskin joint, a chord member to lipskin joint, an inner barrel to lipskin joint, an aft bulkhead to lipskin joint and an outer barrel to lipskin joint of the aircraft engine nacelle inlet lip.

In accordance with one or more aspects of the disclosed embodiment the aircraft engine nacelle inlet lip comprises a Boeing 737 aircraft engine nacelle inlet lip.

In accordance with one or more aspects of the disclosed embodiment the controller is configured to effect positioning of the articulated assembly fixture docking station in a predetermined assembly fixture interchange position between at least two of the predetermined joining positions so that one of the plurality of assembly fixtures is interchanged with another of the plurality of assembly fixtures.

In accordance with one or more aspects of the disclosed embodiment the automated assembly tool comprises an end effector configured to interface with the aircraft engine nacelle inlet lip in opposing directions along a common axis so that the end effector both supports the engine nacelle inlet lip and effects formation of at least one joint of the aircraft engine nacelle inlet lip.

In accordance with one or more aspects of the disclosed embodiment the aircraft engine inlet assembly system further includes mechanical gauging tools movably connected to one of the plurality assembly fixtures so that the mechanical gauging tools are one of rotated and flipped between a measuring position and a retracted position to obtain mechanically acquired dimensions of the aircraft engine nacelle inlet lip.

In accordance with one or more aspects of the disclosed embodiment the mechanically acquired dimensions are transferred to another different one of the plurality assembly fixtures to effect assembly of a portion of the aircraft engine nacelle inlet lip.

In accordance with one or more aspects of the disclosed embodiment each of the plurality of assembly fixtures includes a base having one or more of a plurality of arc sections configured in a circumferential arrangement, a plurality of docking raisers arranged in a circumferential arrangement, the plurality of docking raisers being configured to support the one or more respective portions of the aircraft engine nacelle inlet lip, and one or more clamps configured to clamp the one or more respective portions of the aircraft engine nacelle inlet lip to a respective assembly fixture.

In accordance with one or more aspects of the disclosed embodiment the common fixture is configured to hold one or more of the lipskin, the forward bulkhead, the outer barrel, the inner barrel, the aft attachment ring, the one or more chord members, the aft bulkhead and the inner angle member at multiple stages of assembly.

In accordance with one or more aspects of the disclosed embodiment the common fixture includes one or more of docking raisers and clamps that are configured for selective coupling to the at least one assembly fixture.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method for assembling an aircraft engine nacelle inlet lip having a lipskin, a forward bulkhead, an outer barrel, an inner barrel, an aft attachment ring, one or more chord members, an aft bulkhead and an inner angle member, the method comprising:
   with a controller of an automated workstation, automatically positioning an articulated assembly fixture docking station of the automated workstation in at least two predetermined joining positions, where the articulated docking station is positioned in two degrees of freedom; and
   effecting, with the controller, an ordered assembly of at least a forward bulkhead joint, a forward bulkhead to lipskin joint, a chord member to lipskin joint, an inner barrel to lipskin joint, an aft bulkhead to lipskin joint and an outer barrel to lipskin joint through an interface between an automated assembly tool and at least one of a plurality of assembly fixtures interchangeably mounted on the articulated assembly fixture docking station in the at least two predetermined joining positions, wherein each of the assembly fixtures corresponds to an assembly step of the aircraft engine nacelle inlet lip and at least one of the assembly fixtures is a common fixture that is common to more than one assembly step of the aircraft engine nacelle inlet lip.

2. The method of claim 1, wherein the plurality of assembly fixtures includes a forward bulkhead assembly tool, the method further comprising measuring at least one dimension of the aircraft engine nacelle inlet lip with mechanical gauging tools and transferring the at least one dimension to the forward bulkhead assembly tool.

3. The method of claim 1, wherein assembly of each joint includes at least automatically installing fasteners between one portion of the aircraft engine nacelle inlet lip and at least another portion of the aircraft engine nacelle inlet lip.

4. The method of claim 1, further comprising forming at least one of the joints with an end effector of the automated assembly tool that interfaces with the aircraft engine nacelle inlet lip in opposing directions along a common axis such that the aircraft engine nacelle inlet lip is supported by the end effector while forming the at least one of the joints with the end effector.

5. The method of claim 1, wherein the ordered assembly includes an assembly order of forming the forward bulkhead joint, forming the forward bulkhead to lipskin joint, forming the chord member to lipskin joint, forming the inner barrel to lipskin joint, forming the aft bulkhead to lipskin joint and forming the outer barrel to lipskin joint.

6. An aircraft engine inlet assembly apparatus for assembling an aircraft engine nacelle inlet lip having a lipskin, a forward bulkhead, an outer barrel, an inner barrel, an aft attachment ring, one or more chord members, an aft bulkhead and an inner angle member, the aircraft engine inlet assembly apparatus comprising:

a plurality of assembly fixtures configured to hold one or more respective portions of the aircraft engine nacelle inlet lip, at least one of the plurality of fixtures being a common fixture that is common to more than one assembly step of the aircraft engine nacelle inlet lip;

an automated workstation having an articulated assembly fixture docking station and an automated assembly tool configured to interface with the articulated assembly fixture docking station, the articulated assembly fixture docking station having a two degree of freedom movement, and coupling features configured to interchangeably couple each of the plurality of assembly fixtures to the assembly fixture docking station; and a controller connected to the automated workstation and automated assembly tool, the controller being configured to effect two degree of freedom positioning of the articulated assembly fixture docking station in at least two predetermined joining positions, wherein the controller effects an interface between the automated assembly tool and at least one of the plurality of assembly fixtures disposed on the articulated assembly fixture docking station in the at least two predetermined joining positions, and the at least two joining positions effect an ordered assembly of at least a forward bulkhead joint, a forward bulkhead to lipskin joint, a chord member to lipskin joint, an inner barrel to lipskin joint, an aft bulkhead to lipskin joint and an outer barrel to lipskin joint.

7. The aircraft engine inlet assembly apparatus of claim 6, wherein the controller is configured to effect positioning of the articulated assembly fixture docking station in a predetermined assembly fixture interchange position between the at least two of the predetermined joining positions such that one of the plurality of assembly fixtures is interchanged with another of the plurality of assembly fixtures.

8. The aircraft engine inlet assembly apparatus of claim 6, wherein the automated assembly tool comprises an end effector configured to interface with the aircraft engine nacelle inlet lip in opposing directions along a common axis such that the end effector supports the engine nacelle inlet lip and effects formation of at least one joint of the aircraft engine nacelle inlet lip.

9. The aircraft engine inlet assembly apparatus of claim 6, further comprising mechanical gauging tools movably connected to one of the plurality of assembly fixtures such that the mechanical gauging tools are one of rotated and flipped between a measuring position and a retracted position to obtain mechanically acquired dimensions of the aircraft engine nacelle inlet lip.

10. The aircraft engine inlet assembly apparatus of claim 9, wherein the mechanically acquired dimensions are transferred to another one of the plurality of assembly fixtures to effect assembly of a portion of the aircraft engine nacelle inlet lip.

11. The aircraft engine inlet assembly apparatus of claim 6, wherein each of the plurality of assembly fixtures includes a base having a plurality of arc sections configured in a circumferential arrangement.

12. The aircraft engine inlet assembly apparatus of claim 6, wherein the common fixture is configured to hold one or more of the lipskin, the forward bulkhead, the outer barrel, the inner barrel, the aft attachment ring, the one or more chord members, the aft bulkhead and the inner angle member at multiple stages of assembly, the common fixture including one or more of docking raisers and clamps that are configured for selective coupling to the at least one assembly fixture.

13. An aircraft engine inlet assembly system for assembling an aircraft engine nacelle inlet lip, the system comprising:

an aircraft engine nacelle inlet lip assembly cell including a plurality of assembly fixtures configured to hold one or more respective portions of the aircraft engine nacelle inlet lip, at least one of the plurality of fixtures being a common fixture that is common to more than one assembly step of the aircraft engine nacelle inlet lip;

an automated workstation having an articulated assembly fixture docking station and an automated assembly tool configured to interface with the articulated assembly fixture docking station, the articulated assembly fixture docking station having a two degree of freedom movement, and coupling features configured to interchangeably couple each of the plurality of assembly fixtures to the assembly fixture docking station; and a controller connected to the automated workstation and automated assembly tool, the controller being configured to effect two degree of freedom positioning of the articulated assembly fixture docking station in at least two predetermined joining positions, where the controller effects an interface between the automated assembly tool and at least one of the plurality of assembly fixtures disposed on the articulated assembly fixture docking station in the at least two predetermined joining positions, and the at least two joining positions effect an ordered assembly of at least a forward bulkhead joint, a forward bulkhead to lipskin joint, a chord member to lipskin joint, an inner barrel to lipskin joint, an aft bulkhead to lipskin joint and an outer barrel to lipskin joint of the aircraft engine nacelle inlet lip.

14. The aircraft engine inlet assembly system of claim 13, wherein the controller is configured to effect positioning of the articulated assembly fixture docking station in a predetermined assembly fixture interchange position between the at least two of the predetermined joining positions such that one of the plurality of assembly fixtures is interchanged with another of the plurality of assembly fixtures.

15. The aircraft engine inlet assembly system of claim 13, wherein the automated assembly tool comprises an end effector configured to interface with the aircraft engine nacelle inlet lip in opposing directions along a common axis such that the end effector supports the engine nacelle inlet lip and effects formation of at least one joint of the aircraft engine nacelle inlet lip.

16. The aircraft engine inlet assembly system of claim 13, further comprising mechanical gauging tools movably connected to one of the plurality of assembly fixtures such that the mechanical gauging tools are one of rotated and flipped between a measuring position and a retracted position to obtain mechanically acquired dimensions of the aircraft engine nacelle inlet lip.

17. The aircraft engine inlet assembly system of claim 16, wherein the mechanically acquired dimensions are transferred to another one of the plurality of assembly fixtures to effect assembly of a portion of the aircraft engine nacelle inlet lip.

18. The aircraft engine inlet assembly system of claim 13, wherein each of the plurality of assembly fixtures includes a base having one or more of
- a plurality of arc sections configured in a circumferential arrangement,
- a plurality of docking raisers arranged in a circumferential arrangement, the plurality of docking raisers being configured to support the one or more respective portions of the aircraft engine nacelle inlet lip, and
- one or more clamps configured to clamp the one or more respective portions of the aircraft engine nacelle inlet lip to a respective assembly fixture.

19. The aircraft engine inlet assembly system of claim 13, wherein the common fixture is configured to hold one or more of a lipskin, a forward bulkhead, an outer barrel, an inner barrel, an aft attachment ring, one or more chord members, an aft bulkhead and an inner angle member at multiple stages of assembly.

20. The aircraft engine inlet assembly system of claim 19, wherein the common fixture includes one or more of docking raisers and clamps that are configured for selective coupling to the at least one assembly fixture.

* * * * *